United States Patent [19]
Kiuchi et al.

[11] Patent Number: 5,589,262
[45] Date of Patent: Dec. 31, 1996

[54] PERPENDICULAR MAGNETIC RECORDING MEDIUM HAVING A SOFT MAGNETIC UNDERLAYER WITH A STRIPE MAGNETIC DOMAIN STRUCTURE

[75] Inventors: Katsumi Kiuchi, Ebina; Hiroaki Wakamatsu, Yokohama; Fumitake Suzuki, Kawasaki; Takao Koshikawa, Atsugi, all of Japan

[73] Assignee: Fujitsu Limited, Kawasaki, Japan

[21] Appl. No.: 286,951

[22] Filed: Aug. 8, 1994

Related U.S. Application Data

[63] Continuation of Ser. No. 144,613, Nov. 1, 1993, abandoned, and Ser. No. 531,339, May 31, 1990, abandoned.

[30] Foreign Application Priority Data

| May 31, 1989 | [JP] | Japan | 1-138273 |
| May 31, 1989 | [JP] | Japan | 1-138274 |
| Nov. 20, 1989 | [JP] | Japan | 1-302719 |
| Dec. 19, 1989 | [JP] | Japan | 1-329240 |
| Dec. 20, 1989 | [JP] | Japan | 1-330667 |

[51] Int. Cl.$^6$ ......................................... G11B 5/66
[52] U.S. Cl. ............... 428/336; 428/65.3; 428/694 TM; 428/694 TR; 428/900; 427/130; 360/135
[58] Field of Search ................. 428/694, 900, 428/64, 65, 336, 694 TM, 65.3, 694 TR; 360/135; 427/130

[56] References Cited

U.S. PATENT DOCUMENTS

| 3,890,605 | 6/1975 | Sionczewski | 340/174 TF |
| 3,965,463 | 6/1976 | Chaudhari et al. | 340/174 TF |
| 4,544,591 | 10/1985 | Uesaka et al. | 428/65 |
| 4,657,819 | 4/1987 | Funaki | 428/458 |
| 4,692,899 | 9/1987 | Lo et al. | 365/29 |
| 5,166,613 | 11/1992 | Perry | 324/209 |

FOREIGN PATENT DOCUMENTS

| 0099564 | 2/1984 | European Pat. Off. |
| 62-073413 | 4/1987 | Japan |
| 2-015418 | 1/1990 | Japan |

OTHER PUBLICATIONS

Koikeda, Tosiaki et al "Electron–Microscopic observation of Stripe or Dense Banded Magnetic Domains in nickel rich Permalloy Films" *Applied Physics Letters* vol. 9 No. 9 May 1964.

Tatsumoto, Eiji et al "A New Type of Stripe Domains" *Japanese Journal of Applied Physics* vol. 7 p. 176 Jul. 1968.

Maffitt, K. N. "Electron Mirror Microscopy of Stripe Domains" *Review of Scientific Instruments* vol. 39 No. 2 Feb. 1968.

Lo, "Magnetic Properties of Ni–Fe Films Coupled with Stripe–Domain Films" IEEE Transactions on Magnetics vol. 4 No. 4 Dec. 1968.

*Primary Examiner*—Stevan A. Resan
*Attorney, Agent, or Firm*—Staas & Halsey

[57] ABSTRACT

A perpendicular magnetic recording medium for use on a magnetic recording/reproducing apparatus which has a magnetic head for recording/reproduction includes a substrate, a magnetic recording layer having a perpendicular magnetic anisotropy, and a soft magnetic under layer interposed between the substrate and the magnetic recording layer. The soft magnetic under layer includes a mechanism for for suppressing motion of the domain walls of the soft magnetic under layer at least with respect to an external magnetic field which is smaller than a stray magnetic field in a vicinity of the magnetic head within the magnetic recording/reproducing apparatus.

15 Claims, 38 Drawing Sheets

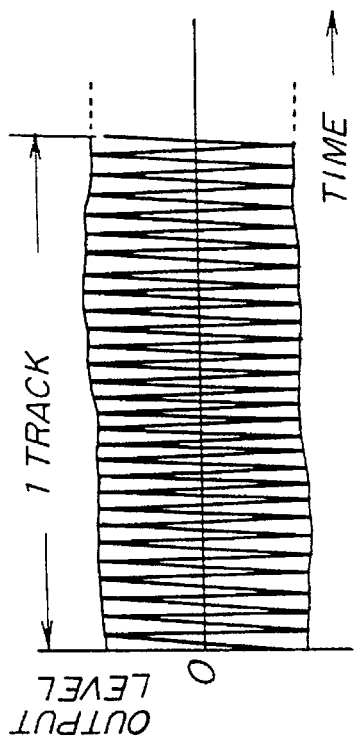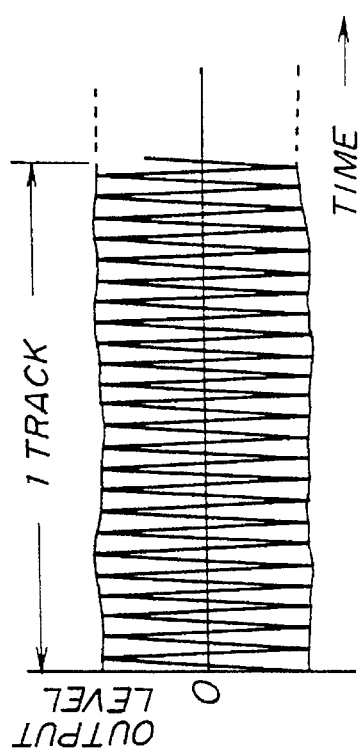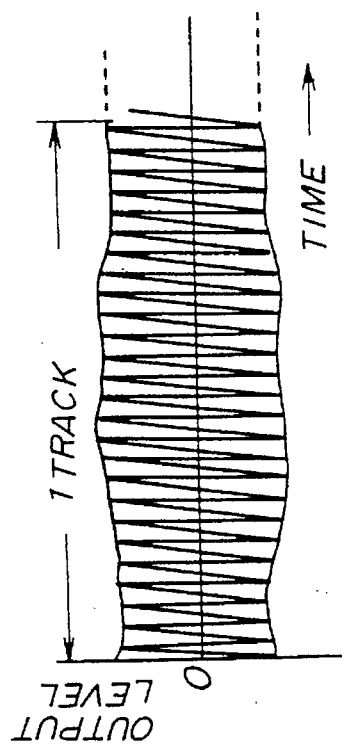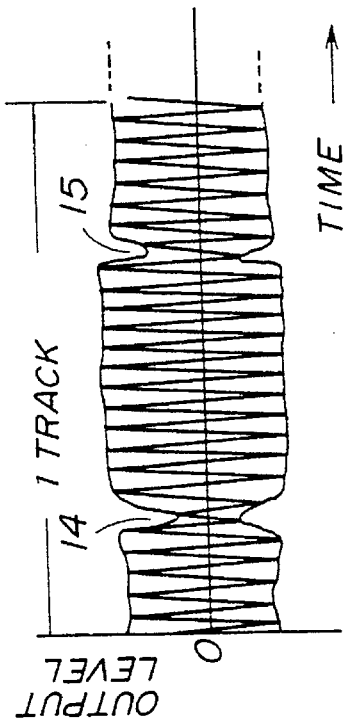

1K

FIG.46
| RECORDING MEDIUM | ① | ② | ③ |
|---|---|---|---|
| UNDER LAYER PERMEABILITY | 1,500 | 800 | 100 |
| THICKNESS (μm) | 0.5 | 0.5 | 0.5 |
| REPRODUCED SIGNAL UNDER NO EXTERNAL MAGNETIC FIELD | 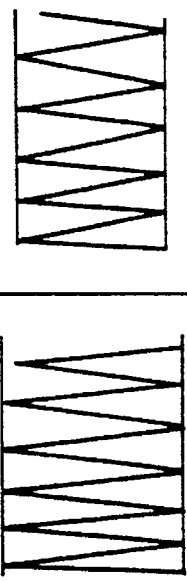 | 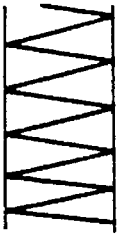 | 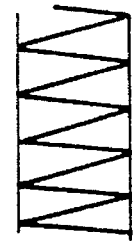 |
| EXTERNAL MAGNETIC FIELD (Oe) | 3 | 10 | 10 |
| REPRODUCED SIGNAL UNDER EXTERNAL MAGNETIC FIELD | 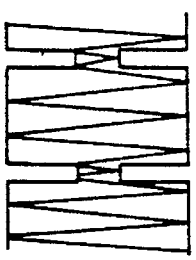 | 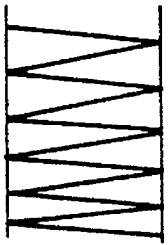 | 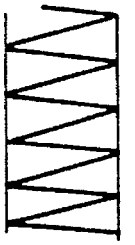 |

FIG.48
| RECORDING MEDIUM<br>UNDER LAYER | ④ | ⑤ | ⑥ |
|---|---|---|---|
| PERMEABILITY | 100 | 100 | 50 |
| THICKNESS (μm) | 0.5 | 2 | 20 |
| REPRODUCED SIGNAL UNDER NO EXTERNAL MAGNETIC FIELD | 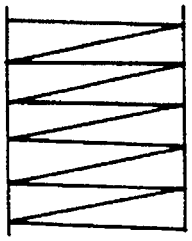 | 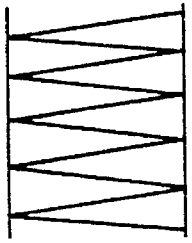 | 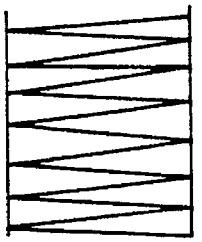 |
| EXTERNAL MAGNETIC FIELD (Oe) | 10 | 10 | 10 |
| REPRODUCED SIGNAL UNDER EXTERNAL MAGNETIC FIELD | 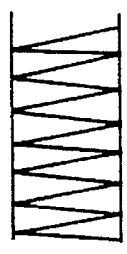 | 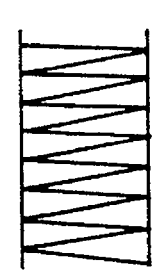 | 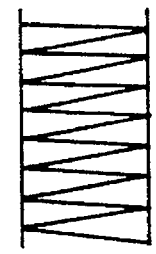 |

FIG. 50
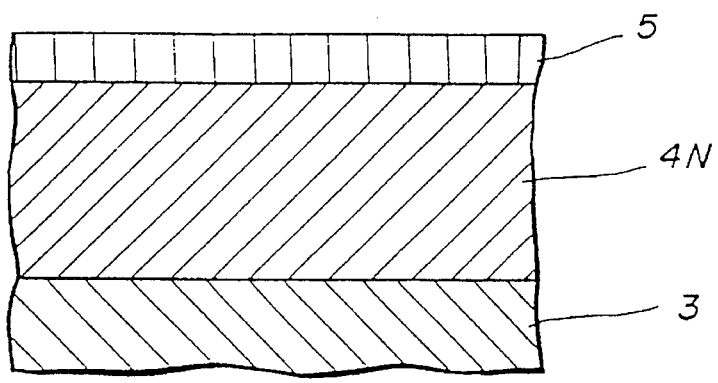
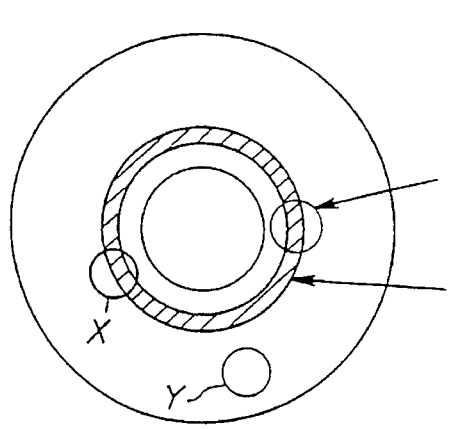
FIG. 51A
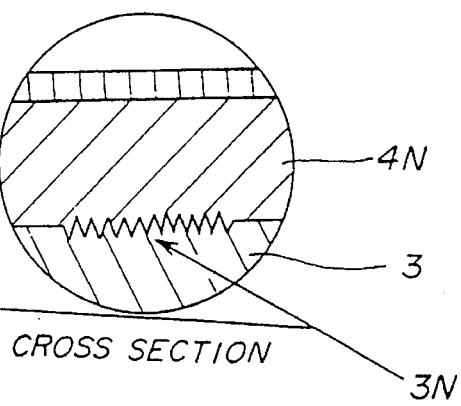
FIG. 51B
CROSS SECTION

PERPENDICULAR MAGNETIC RECORDING MEDIUM HAVING A SOFT MAGNETIC UNDERLAYER WITH A STRIPE MAGNETIC DOMAIN STRUCTURE

This application is a continuation of application Ser. Nos. 08/144,613 and 07/531,339, filed Nov. 1, 1993 and May 31, 1990, respectively, now abandoned.

BACKGROUND OF THE INVENTION

The present invention generally relates to magnetic recording media which are often loaded into magnetic disk apparatuses, magnetic tape apparatuses and the like, and which are used as external memory devices of a computer and to methods of producing such magnetic recording media. More particularly, the present invention relates to a perpendicular magnetic recording medium which has a double-layered structure and a method of producing such a perpendicular magnetic recording medium.

Recently, the magnetic disk apparatuses are made compact and the magnetic recording and reproduction are carried out with a high density. As a high density recording system which is far superior to the conventional longitudinal magnetic recording system, there is the so-called perpendicular magnetic recording system. According to the perpendicular magnetic recording system, a residual magnetization is formed in a direction perpendicular to the surface of the magnetic recording medium, and there is active research and development of perpendicular magnetic recording in many research institutes and companies.

A single pole head and a ring head have been proposed for the perpendicular magnetic recording. On the other hand, perpendicular magnetic recording media having, variously a single-layer structure and a double-layered structure have been proposed for the perpendicular magnetic recording. The single-layer recording medium has a recording layer made of CoCr, for example. The double-layered recording medium has a recording layer and a high permeability layer which is provided under the recording layer and is made of NiFe, for example. When carrying out the perpendicular magnetic recording, it is known that optimum results are obtained by use of a combination of the single pole head and the double-layered recording medium.

FIG. 1 shows a double-layered perpendicular magnetic recording medium 1 and a single pole head 2. The recording medium 1 includes an Al substrate 3 which is subjected to an alumite surface processing, a NiFe soft magnetic under layer 4, and a CoCr perpendicular magnetic recording layer 5 which has a perpendicular magnetic anisotropy. The head 2 includes a main pole 6, an auxiliary yoke 7, and a coil 7a. The under layer 4 is often referred to as a backing layer. The under layer 4 functions as a path for the magnetic flux, and the recording and reproducing sensitivity is improved by the provision of the under layer 4.

When a stray magnetic field source 8 exists when carrying out the perpendicular magnetic recording and reproduction using the arrangement shown in FIG. 1, a magnetic flux 9 from the source 8 is concentrated at the main pole 6, and in addition, the concentrated magnetic flux 9 easily flows to the under layer 4 via the recording layer 5 as indicated by an arrow 10. Because of this flow of the magnetic flux 9, there is a problem in that the information recorded on the recording medium 1 is easily erased and it is a main objective in the perpendicular magnetic recording and reproduction to solve this problem.

Accordingly, when reducing the perpendicular magnetic recording system to practice, it is highly desirable to develop a perpendicular magnetic recording medium in which the erasure of information due to the stray magnetic field is suppressed.

FIG. 2 shows a conventional perpendicular magnetic recording medium 1A. In FIG. 2, those parts which are essentially the same as those corresponding parts in FIG. 1 are designated by the same reference numerals, and a description thereof will be omitted. A soft magnetic under layer 4A includes magnetic domains 11-1, 11-2, 11-3 and the like as shown in FIG. 2 and shown on an enlarged scale in FIG. 3. An arrow 12 indicates a direction of the magnetic spin. In the magnetic domains 11-1, 11-2 and the like, the magnetic spin is parallel to the surface of the under layer 4A. In addition, a domain wall 13 clearly exists between the magnetic domains. The size of the magnetic domain is in the order of several μm to several mm. Generally, the under layer 4A has a thickness in the range of 0.5 μm, and in order to improve the recording and reproducing sensitivity, the magnetic characteristics are set such that the permeability is 1500 or greater and the coercivity of 10 Oe or less. On the other hand, the recording layer 5 usually has a thickness in the range of 0.2 μm, and the perpendicular coercivity is set to approximately 1000 Oe.

FIG. 4 shows a waveform of a signal which is reproduced from one track turn of the recording medium 1A when a signal having a constant level is recorded. FIG. 5 shows a waveform of a signal which is reproduced from the same track turn when a magnetic field of 3 Oe is applied to the recording medium 1A from directly above the head 2 during the reproduction. The recording magnetic field of the head 2 at the time of the recording is set to be greater than the perpendicular coercivity of the recording layer 5, and is normally 2000 Oe or greater. Accordingly, the external magnetic field of 3 Oe is considerably small compared to the recording magnetic field of the head 2.

However, the signal level of the reproduced signal decreases at parts as indicated by 14 and 15 in FIG. 5 even in response to the small external magnetic field. This decrease in the signal level is caused by the fact that the recorded information on the recording layer 5 is partially erased by the external magnetic field. Normally, a stray magnetic field in the range of 3 to 5 Oe inevitably exists within the magnetic recording apparatus. As a result, the erasure of recorded information due to the stray magnetic field easily occurs with the conventional recording medium 1A, and the reliability of the recorded information is poor.

It may be regarded that the erasure of the recorded information due to the stray magnetic field is closely related to the random motion of the domain walls in the under layer 4A. In other words, it may be regarded that the permeability, at a part of the under layer 4A, temporarily becomes high when the domain walls of the under layer at this part under go a random motion due to the stray magnetic field, and the information recorded at a corresponding part of the recording layer 5 is erased because of the magnetic flux of the stray magnetic field flowing to the part of the under layer 4A via the main pole 6 of the head 2.

SUMMARY OF THE INVENTION

Accordingly, it is a general object of the present invention to provide a novel and useful perpendicular magnetic recording medium and production method thereof, in which the problems described above are eliminated.

Another and more specific object of the present invention is to provide a perpendicular magnetic recording medium for use on a magnetic recording/reproducing apparatus which has a magnetic head for recording/reproduction, comprising a substrate, a magnetic recording layer having a perpendicular magnetic anisotropy, and a soft magnetic under layer interposed between the substrate and the magnetic recording layer, where the soft magnetic under layer includes suppression means for suppressing motion of domain walls of the soft magnetic under layer at least with respect to an external magnetic field which is smaller than a stray magnetic field in the vicinity of the magnetic head within the magnetic recording/reproducing apparatus. According to the perpendicular magnetic recording medium of the present invention, it is possible to prevent erasure of recorded information on the perpendicular magnetic recording medium due to the stray magnetic field, and it is possible to realize a perpendicular magnetic recording medium having a high performance.

Still another object of the present invention to provide a method of producing a perpendicular magnetic recording medium which comprises a substrate, a soft magnetic layer formed on the substrate and a magnetic recording layer formed on the soft magnetic layer, which method comprises the steps of forming a band-shaped concavo-convex undulation which is approximately parallel to recording tracks which are formed on the magnetic recording layer, where the band-shaped concavo-convex is formed on a part, only, of at least one of the substrate and the soft magnetic layer, forming the soft magnetic layer on the substrate, and forming the magnetic recording layer on the soft magnetic layer. According to the method of the present invention, it is possible to realize a perpendicular magnetic recording medium having a high performance such that the erasure of recorded information on the perpendicular magnetic recording medium due to the stray magnetic field is effectively prevented.

A further object of the present invention is to provide a method of producing a perpendicular magnetic recording medium which comprises a substrate, a soft magnetic layer formed on the substrate and a magnetic recording layer formed on the soft magnetic layer, which method comprises the steps of forming a semi-completed recording medium which includes at least the substrate and the soft magnetic layer, and adjusting magnetic domains of the soft magnetic layer by applying a magnetic field to the soft magnetic layer of the semi-completed recording medium. According to the method of the present invention, it is possible to realize a perpendicular magnetic recording medium having a high performance such that the erasure of recorded information on the perpendicular magnetic recording medium due to the stray magnetic field is effectively prevented.

Another object of the present invention is to provide a method of producing a perpendicular magnetic recording medium which comprises a substrate, an adhesion layer formed on the substrate, a soft magnetic layer formed on the adhesion layer and a magnetic recording layer formed on the soft magnetic layer, which method comprises the steps of forming a band-shaped concavo-convex undulation which is approximately parallel to recording tracks which are formed on the magnetic recording layer, where the band-shaped concavo-convex undulation is formed on a part, only, of at least one of the substrate, the adhesion layer and the soft magnetic layer, forming the soft magnetic layer on the substrate, and forming the magnetic recording layer on the soft magnetic layer. According to the method of the present invention, it is possible to realize a perpendicular magnetic recording medium having a high performance such that the erasure of recorded information on the perpendicular magnetic recording medium due to the stray magnetic field is effectively prevented.

Other objects and further features of the present invention will be apparent from the following detailed description when read in conjunction with the accompanying drawings.

BRIEF DESCRIPTION OF THE DRAWINGS

FIG. 25A shows a waveform of a signal reproduced from one track turn of the perpendicular magnetic recording medium shown in FIG. 22, and FIG. 25B shows a waveform of a signal reproduced from one track turn of the perpendicular magnetic recording medium shown in FIG. 23;

FIG. 26A shows a waveform of a signal reproduced from the same one track turn of the perpendicular magnetic recording medium shown in FIG. 22 under an external magnetic field of 3 Oe, and FIG. 26B shows a waveform of a signal reproduced from the same one track turn of the perpendicular magnetic recording medium shown in FIG. 23 under an external magnetic field of 6 Oe;

FIG. 46 is a diagram for explaining results of an experiment on the relationship between the permeability of the under layer and the erasure of recorded information due to the stray magnetic field;

FIG. 48 is a diagram for explaining results of an experiment on the relationship between the thickness of the under layer and the reproduced output;

FIG. 50 is a cross sectional view showing an essential part of a perpendicular magnetic recording medium for explaining a first embodiment of a method of producing a perpendicular magnetic recording medium according to the present invention;

FIG. 51A is a plan view of the perpendicular magnetic recording medium shown in FIG. 50;

FIG. 51B is an enlarged view of a portion of the structure shown in FIG. 51A, identified by a corresponding circle in the view of FIG. 51A;

DESCRIPTION OF THE PREFERRED EMBODIMENTS

Figure 2:
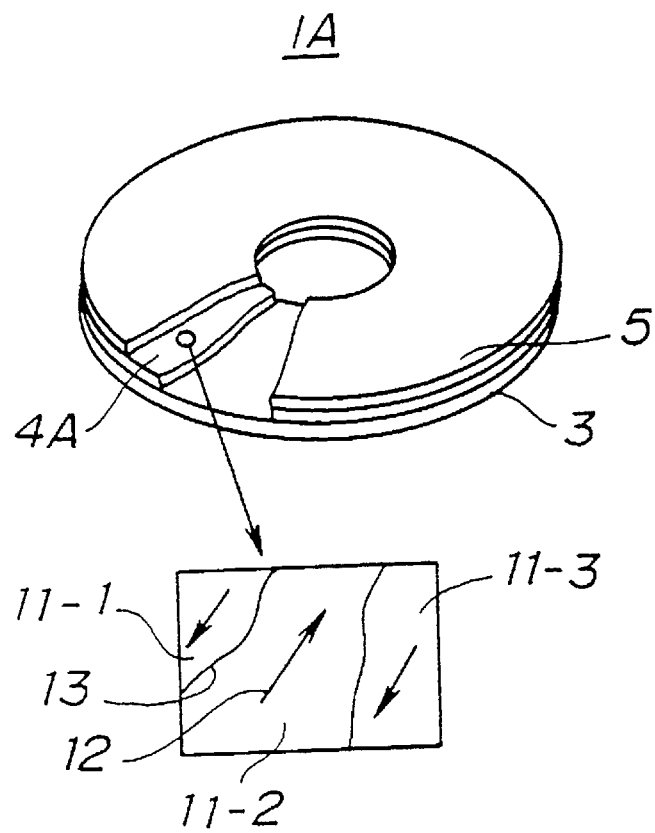
FIG. 2 is a perspective view showing the conventional perpendicular magnetic recording medium.
Figure 3:
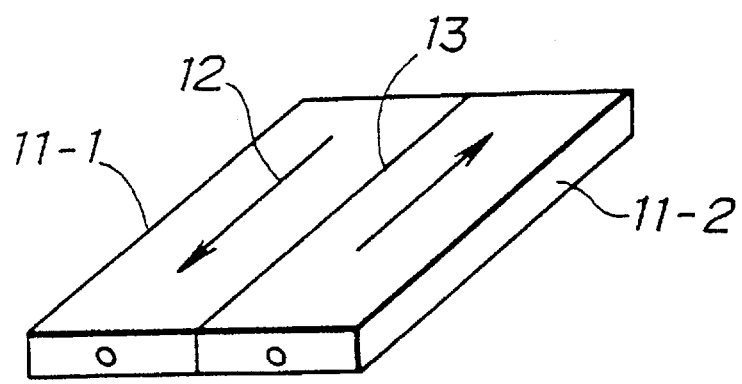
FIG. 3 is a perspective view showing a model of in-plane magnetic domains in a soft magnetic under layer of the perpendicular magnetic recording medium shown in FIG. 2.
Figure 4:
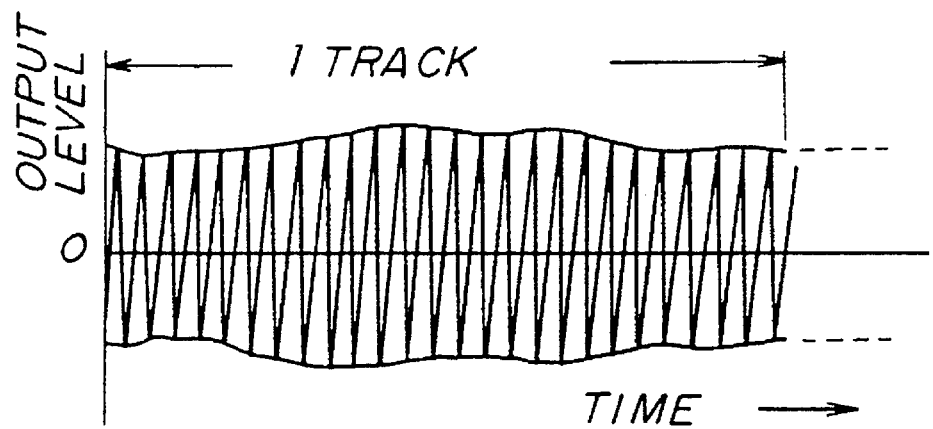
FIG. 4 shows a waveform of a signal reproduced from one track turn of the perpendicular magnetic recording medium shown in FIG. 2.
Figure 6:
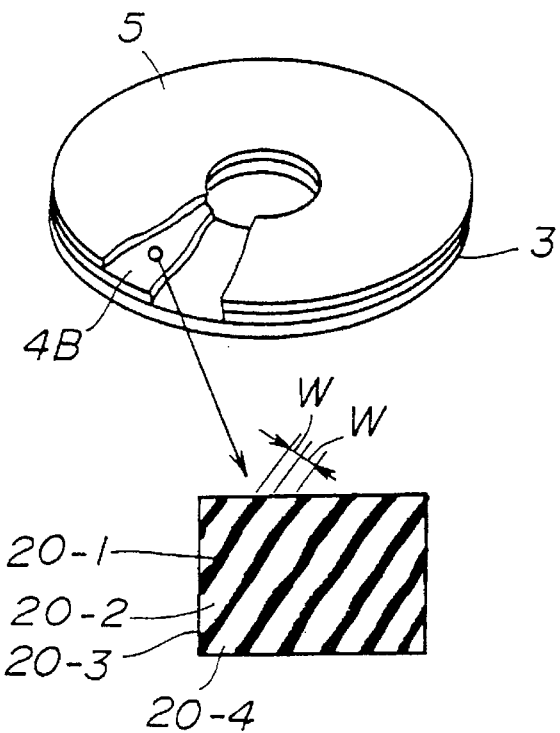
FIG. 6 is a perspective view showing a first embodiment of a perpendicular magnetic recording medium according to the present invention.

FIG. 6 shows a first embodiment of a perpendicular magnetic recording medium according to the present invention. In FIG. 6, those parts which are essentially the same as those corresponding parts in FIG. 2 are designated by the same reference numerals, and a description thereof will be omitted.

As shown in FIG. 6, a soft magnetic under layer 4B of a perpendicular magnetic recording medium 1B has a stripe magnetic domain structure including band-shaped magnetic domains 20-1, 20-2, 20-3, 20-4 and the like.

Figure 7:
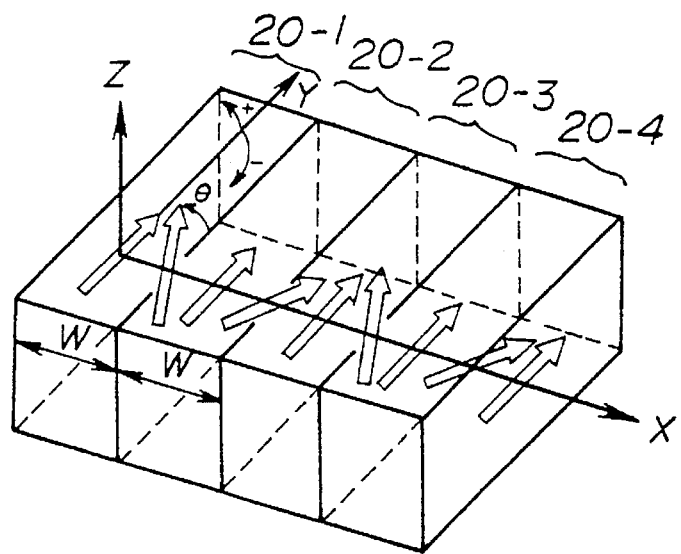
FIG. 7 shows a model of a stripe magnetic domain structure of the first embodiment shown in FIG. 6.
Figure 8:
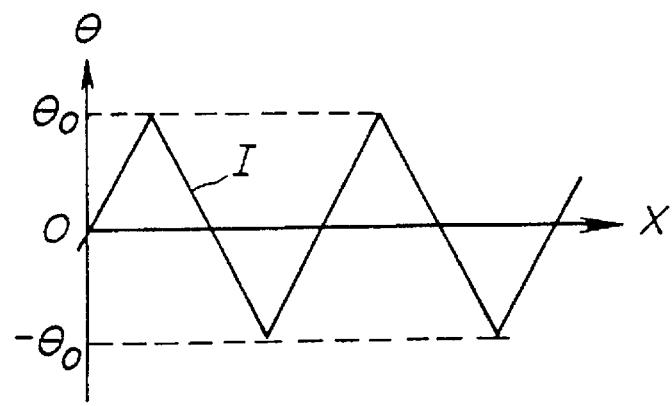
FIG. 8 shows a change of the magnetic spin.

A description is now given of the stripe magnetic domain structure. FIG. 7 shows a model of the stripe magnetic domain structure. As indicated by a line I in FIG. 8, the angle of the magnetic spin changes continuously in the X-axis direction. As a result, the magnetic domain and the domain wall are not clearly distinguished. In addition, because the magnetic spin changes continuously in the X-axis direction, a random motion of the domain walls will not occur even when a stray magnetic field acts on the recording medium 1B, and the rotating magnetization is made in which the angle of the magnetic spin changes.

When the inclination direction of the magnetic spin with respect to be the xy-plane is distinguished by a positive (+) direction and a negative (−) direction and each domain with a different inclination direction is assumed to make up a magnetic domain, the magnetic domains 20-1, 20-2, 20-3, 20-4 and the like are formed in the under layer 4B. The magnetic domains 20-1 and 20-3 having the magnetic spin with the positive inclination angle are indicated in black in FIG. 6, while the magnetic domains 20-2 and 20-4 having the magnetic spin with the negative inclination angle are indicated in white in FIG. 6. In addition, each of the magnetic domains 20-1 through 20-4 has a band shape with a width w. The width w depends on the thickness, the 1 composition and the method of forming the under layer 4B, but the width w is usually set in the micron order. Although the respective widths w of the magnetic domains 20-1 through 20-4 slightly differ, the pitch of the magnetic domains 20-1 through 20-4 is approximately regular.

Figure 9:
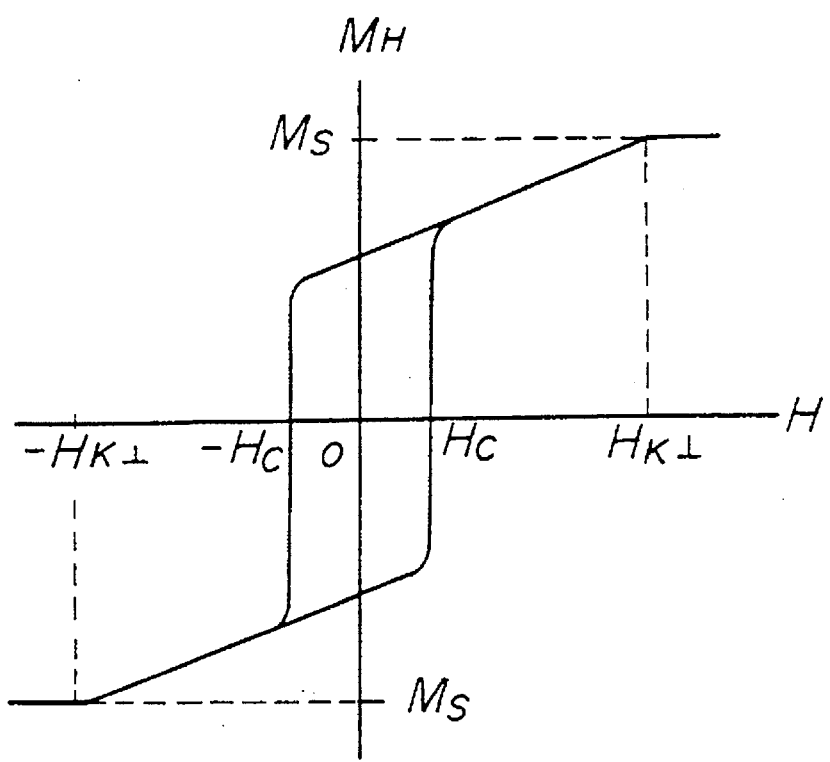
FIG. 9 shows a magnetic characteristic of a soft magnetic under layer of the first embodiment shown in FIG. 6.

The under layer 4B which has the stripe magnetic domain structure displays a magnetic characteristic shown in FIG. 9.

When a sufficiently large magnetic field is applied in the in-plane direction (y-axis direction in FIG. 7), the magnetization becomes parallel to the y-axis direction and saturates. When the magnetization is decreased, the stripe magnetic domain structure is obtained when the anisotropic magnetic field $Hk\perp$ of the uniaxial magnetic anisotropy perpendicular to the in-plane direction is reached. With decreases of the magnetic field, an angle θ formed between the magnetization and the in-plane direction increases and a demagnetization occurs. Accordingly, an inclined linear magnetization characteristic shown in the upper part of FIG. 9 is obtained. Even when the direction of the magnetic field is changed to the −y direction, the angle θ simply increases for a while but an in-plane rotation of the magnetization starts when a certain coercivity −Hc is reached. Hence, the direction of the stripe rotates as the in-plane rotation of the magnetization starts, and the magnetization eventually occurs in the −y direction. This corresponds to the perpendicular magnetization curve for H=−Hc. When the magnitude of the magnetization is further increased, the angle θ then decreases and becomes zero at $H=-Hk\perp$ and a saturation state is reached.

When a sputtering process is employed to form the under layer 4B, the stripe magnetic domain structure can be realized by appropriately selecting the sputtering conditions such as the target composition and the ambient pressure. In this embodiment, the under layer 4B is formed on the Al substrate 3 which is subjected to the alumite surface processing under the following condition [1] so as to realize the stripe magnetic domain structure. In addition, the recording medium 1B is completed by forming on the under layer 4B the CoCr recording layer 5 which has a thickness of 0.15 μm and a perpendicular coercivity of 1000 Oe.

Condition [1]
Sputtering System: Planar Magnetron
Target: Fe-81 wt % Ni (6 inch diameter)
RF Power: 1 kW
Ar Ambient Pressure: 3 mTorr
Substrate Temperature: 100° C.
Thickness of Layer 4B: 5 μm It was confirmed by use of a Kerr-effect microscope that the motion of the domain walls of the under layer 4B is suppressed even when the external magnetic field exceeds 5 Oe.

Figure 10:
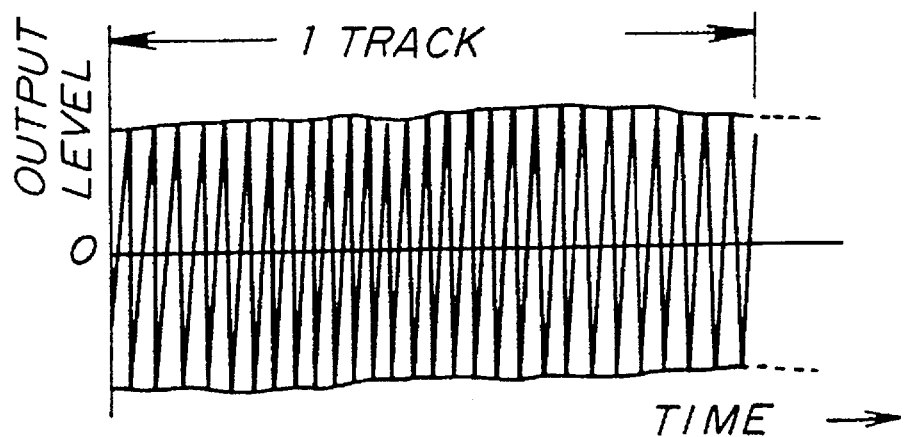
FIG. 10 shows a waveform of a signal reproduced from one track turn of the perpendicular magnetic recording medium shown in FIG. 6.
Figure 11:
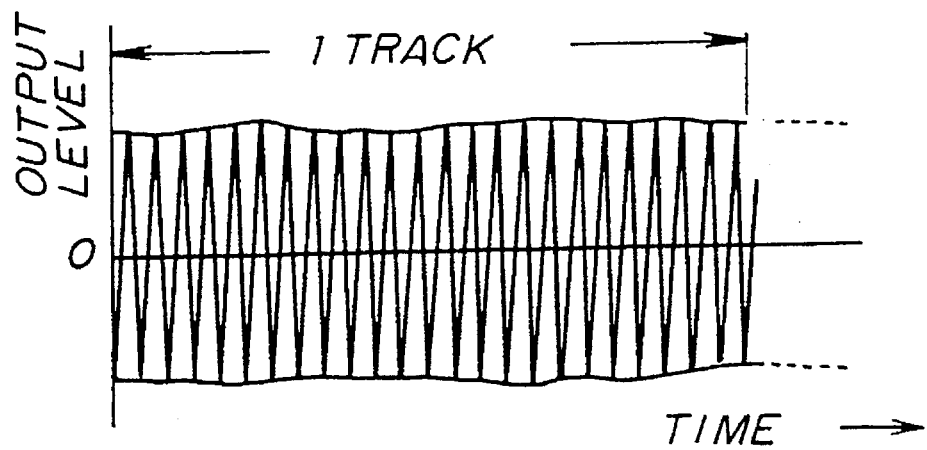
FIG. 11 shows a waveform of a signal reproduced from the one track turn of the perpendicular magnetic recording medium shown in FIG. 6 under an external magnetic field of 10 Oe.

Next, a description will be given of the results which are obtained when an experiment was performed to test the reliability of the recorded information on the recording medium 1B against the external magnetic field. FIG. 10 shows the waveform of a signal which is reproduced from a one track turn of the recording medium 1B when a signal having a constant level is recorded. Then, a signal was reproduced from the same one track turn of the recording medium 1B while applying an external magnetic field of 3 to 10 Oe on the recording medium 1B from directly above the head during the reproduction. It was confirmed that no decrease of the signal level occurs even under such external magnetic fields. FIG. 11 shows the waveform of the signal which is reproduced from the same one track turn of the recording medium 4B when the applied external magnetic field is 10 Oe. As may be seen from FIG. 11, no erasure of the recorded information occurs even under the external magnetic field of 10 Oe.

Therefore, the erasure of the recorded information on the recording medium 1B due to the stray magnetic field is effectively suppressed according to this embodiment, and the reliability of the recorded information on the recording medium 1B is extremely high.

Figure 12:
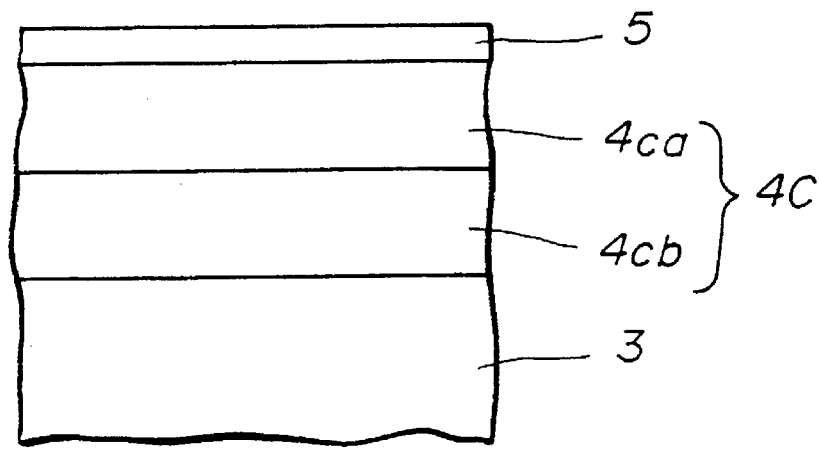
FIGS. 12 and 13 are cross sectional views respectively showing an essential part of second and third embodiments of the perpendicular magnetic recording medium according to the present invention.
Figure 13:
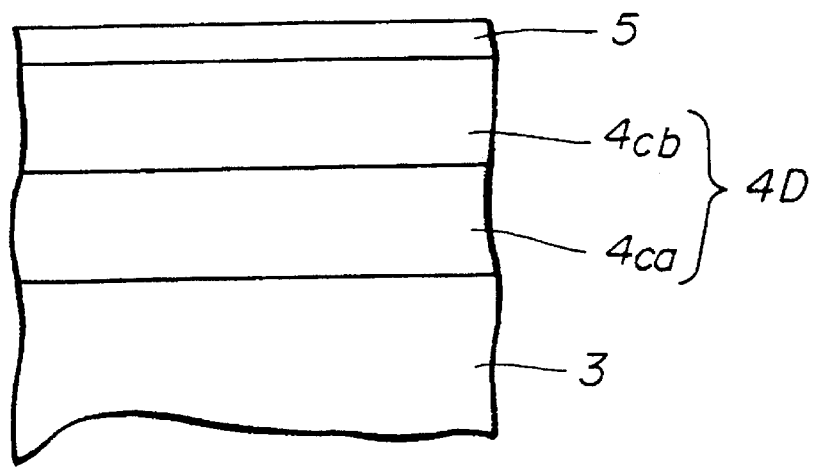

Next, a description will be given of second and third embodiments of the perpendicular magnetic recording medium according to the present invention, by referring to FIGS. 12 and 13. FIGS. 12 and 13 respectively show cross sections of an essential part of the second and third embodiments.

In the second embodiment shown in FIG. 12, a recording medium 1C has a under layer 4C which has a double-layered structure. The under layer 4C is made up of a first soft magnetic under layer 4ca which has a stripe magnetic domain structure, and a second soft magnetic under layer 4cb which has an in-plane magnetic domain structure.

In the third embodiment shown in FIG. 13, a recording medium 1D has a under layer 4D which also has a double-layered structure. The under layer 4D is made up of a first soft magnetic under layer 4da which has an in-plane magnetic domain structure, and a second soft magnetic under layer 4db which has a stripe magnetic domain structure.

The under layers 4C and 4D of the recording media 1C and 1D can be formed by the sputtering process described above. But in the second and third embodiments, the under layers 4C and 4D are formed by use of a plating apparatus shown in FIG. 14. A plating solution 27 within a plating chamber 33 includes nickel sulfate ($NiSO_4$, $6H_2O$), nickel chloride ($NiCl_2$) and ferrous sulfate ($FeSO_4$, $7H_2O$) as the main components. The substrate 3 is mounted on a substrate holder 26, and a plating electrode 28 is provided at the lower part of the plating chamber 33. The soft magnetic under layer having the stripe magnetic domain structure or the soft magnetic under layer having the in-plane magnetic domain structure is formed on the nickel plated Al substrate 3 by selecting the following condition [2]. The thickness of both the soft magnetic under layer having the stripe magnetic domain structure and the soft magnetic under layer having the in-plane magnetic domain structure is set to 0.5 µm.

Figure 15A:
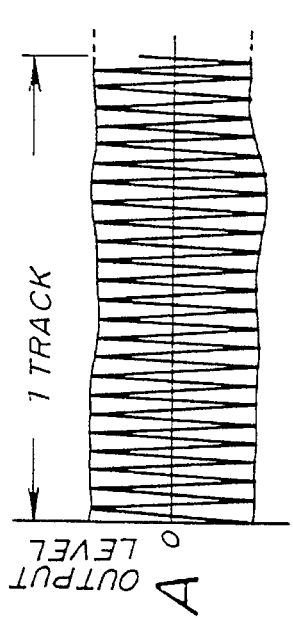
FIG. 15A shows a waveform of a signal reproduced from one track turn of the perpendicular magnetic recording medium shown in FIG. 12.
Figure 15B:
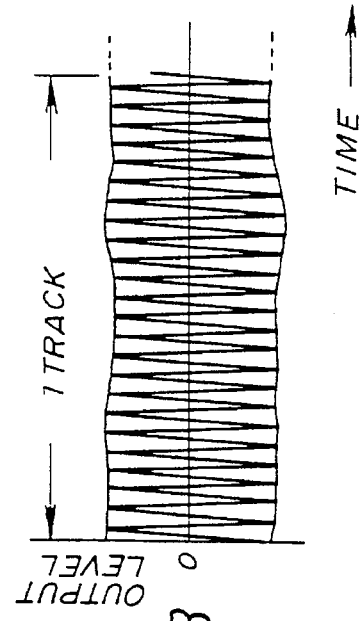
FIG. 15B shows a waveform of a signal reproduced from the same one track turn of the perpendicular magnetic recording medium shown in FIG. 12 under an external magnetic field of 10 Oe.
Figure 16A:
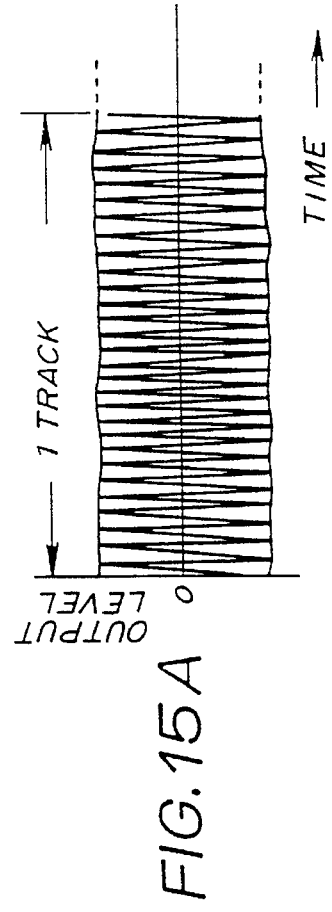
FIG. 16A shows a waveform of a signal reproduced from one track turn of the perpendicular magnetic recording medium shown in FIG. 13.
Figure 16B:
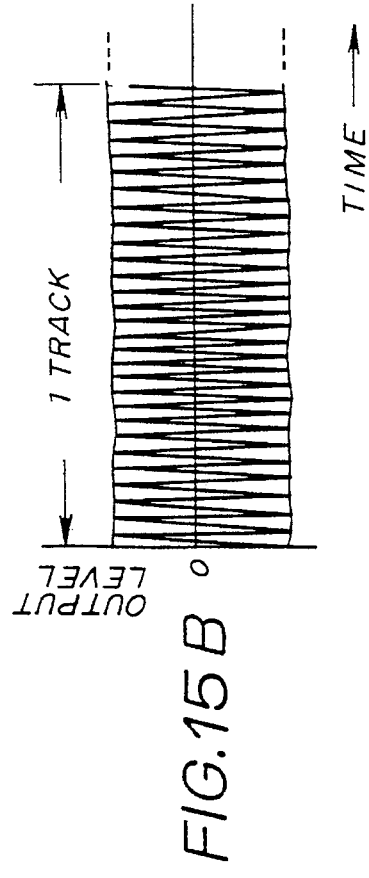
FIG. 16B shows a waveform of a signal reproduced from the same one track turn of the perpendicular magnetic recording medium shown in FIG. 13 under an external magnetic field of 10 Oe.

Condition [2]
In-Plane Magnetic Domain Structure
Chamber Temperature: 30° to 37° C.
Substrate Rotation Frequency: 90 to 170 rpm
Current Density: 2 to 6 A/dm$^2$
Stripe Magnetic Domain Structure
Chamber Temperature: over 40° C.
Substrate Rotation Frequency: 90 to 170 rpm
Current Density: 2 to 6 A/dm$^2$ FIG. 15A shows the waveform of a signal which is reproduced from one track turn of the recording medium 1C when a signal having a constant level is recorded, and FIG. 15B shows the waveform of a signal which is reproduced from the same one track turn of the recording medium 1C when an external magnetic field of 10 Oe is applied on the recording medium 1C from directly above the single pole head during the reproduction. On the other hand, FIG. 16A shows the waveform of a signal which is reproduced from one track turn of the recording medium 1D when a signal having a constant level is recorded, and FIG. 16B shows the waveform of a signal which is reproduced from the same one track turn of the recording medium 1D when an external magnetic field of 10 Oe is applied on the recording medium 1D from directly above the single pole head during the reproduction. As may be seen from FIGS. 15B and 16B, no decrease of the signal level occurs even when the recording media 1C and 1D have applied there to an external magnetic field of 10 Oe which is large compared to the stray magnetic field of 3 to 5 Oe within the magnetic recording apparatus. It is thus confirmed that the erasure of the recorded information does not occur. Therefore, the reliability of the recorded information on the recording media 1C and 1D is high against the stray magnetic field.

In the second and third embodiments, the under layers 4C and 4D respectively have the double-layered structure. However, the alternate formation of the under layer having the stripe magnetic domain structure and the under layer having the in-plane magnetic domain structure may be repeated an arbitrary number of times to obtain similar effects.

Figure 17:
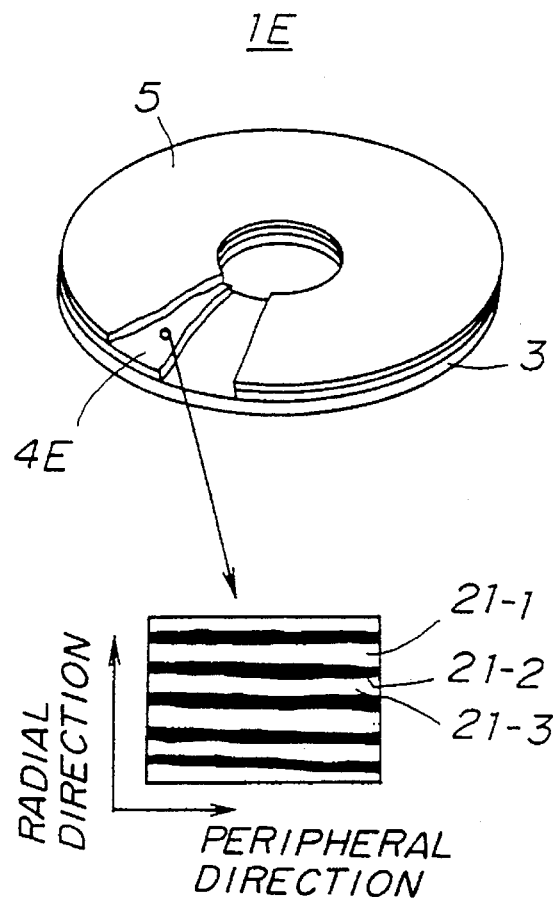
FIG. 17 is a perspective view generally showing a fourth embodiment of the perpendicular magnetic recording medium according to the present invention.

Next, a description will be given of a fourth embodiment of the perpendicular magnetic recording medium according to the present invention, by referring to FIG. 17. In FIG. 17, those parts which are essentially the same as those corresponding parts in FIG. 6 are designated by the same reference numerals, and a description thereof will be omitted.

In FIG. 17, a recording medium 1E has an under layer 4E which has a stripe magnetic domain structure. As shown on an enlarged scale in the lower part of FIG. 17, each of the band-shaped magnetic domains 21-1, 21-2, 21-3 and the like extends in a circumferential (peripheral) direction of the recording medium 1E, that is, in a direction approximately parallel to the tracks formed on the recording layer 5. It is assumed that concentric tracks are formed on the recording layer 5.

Figure 18:
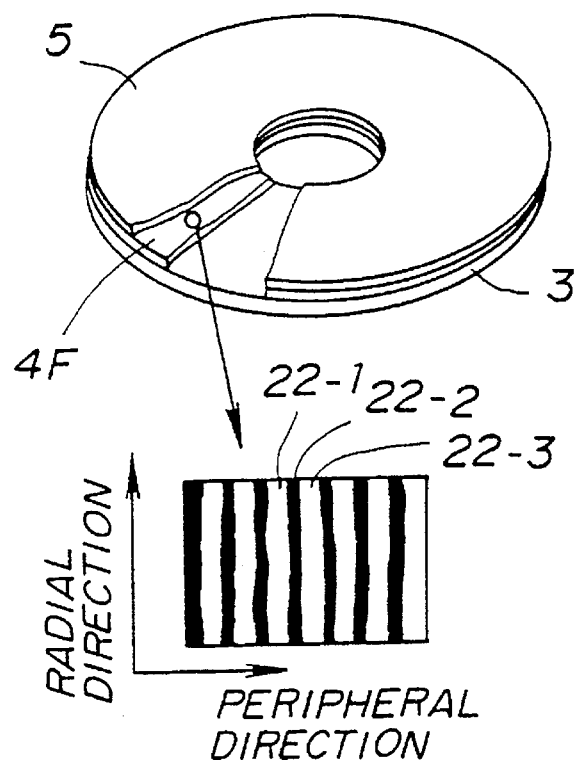
FIG. 18 is a perspective view generally showing a perpendicular magnetic recording medium in which each band-shaped magnetic domain in a soft magnetic under layer extend in a radial direction.
Figure 19:
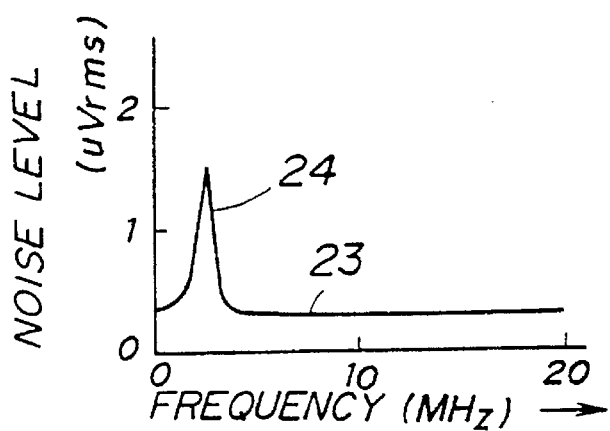
FIG. 19 shows a noise spectrum of the perpendicular magnetic recording medium shown in FIG. 18.

FIG. 18 shows a recording medium 1F which has a under layer 4F with a stripe magnetic domain structure. However, as shown on an enlarged scale in the lower part of FIG. 18, each of the band-shaped magnetic domains 22-1, 22-2 and the like extends in the radial direction, that is, in a direction approximately perpendicular to the tracks formed on the recording layer 5. For this reason, the main pole traverses each of the band-shaped magnetic domains 22-1, 22-2 and the like at the time of the reproduction. In this case, the noise spectrum has a shape as indicated by a line 23 in FIG. 19. When it is assumed that the velocity of the recording medium 1F is 13 m/s, a noise peak 24 is generated in a vicinity of 3 MHz which corresponds to the stripe pitch of approximately 2 µm. As a result, the noise increases and deteriorates the signal-to-noise (S/N) ratio, and problems are introduced when an attempt is made to realize a high density recording.

Figure 20:
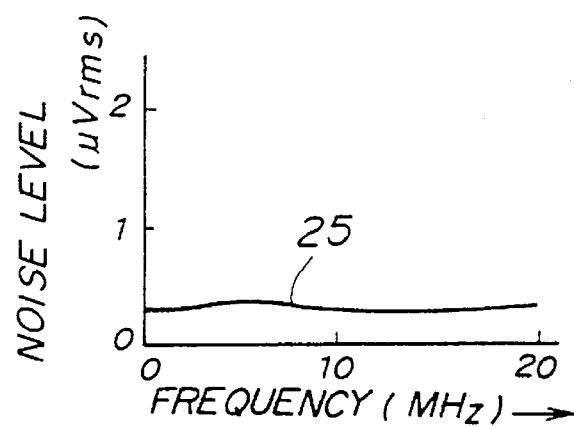
FIG. 20 shows a noise spectrum of the perpendicular magnetic recording medium shown in FIG. 17.

On the other hand, in the case of the recording medium 1E shown in FIG. 17, the main pole will not traverse the band-shaped magnetic domains 21-1, 21-2 and the like. For this reason, the noise spectrum has a shape as indicated by a line 25 in FIG. 20, and no noise peak is generated. Therefore, the recorded information on the recording medium 1E will not be easily erased due to the stray magnetic field, and in addition, the S/N ratio is improved.

Of course, similar effects are obtainable when each band-shaped magnetic domain of the layer having the stripe magnetic domain structure and making up a part of the under layers 4C or 4D extends approximately parallel to the tracks formed on the recording layer 5 in each of the second and third embodiments described above.

Figure 21:
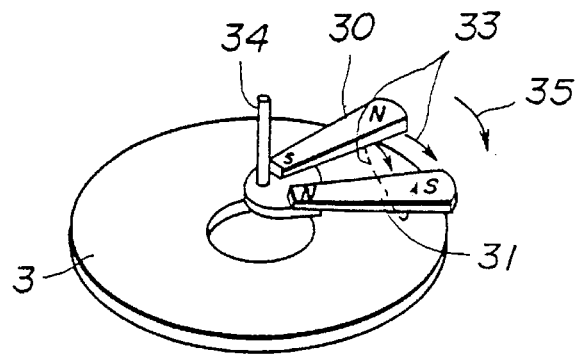
FIG. 21 is a perspective view for explaining a method of forming a stripe magnetic domain structure of the perpendicular magnetic recording medium shown in FIG. 17.

Next, a description will be given of a method of forming the stripe magnetic domain structure of the recording medium 1E shown in FIG. 17, by referring to FIG. 21. In FIG. 21, permanent magnets 30 and 31 are arranged above the top surface of the substrate 3 within a sputtering apparatus. A magnetic flux 33 acts in a circumferential direction of the substrate 3. During the sputtering, the permanent magnets 30 and 31 are rotated about a shaft 34 in a direction 35. As a result, a magnetic field is applied on the lower surface of the substrate 3 in the circumferential direction thereof. When the sputtering process is performed under a condition similar to that used in the first embodiment, it is possible to form on the lower surface of the substrate 3 the soft magnetic under layer 4E which has the stripe magnetic domain structure in which each of the band-shaped magnetic domains 21-1, 21-2 and the like extends in the circumferential direction of the substrate 3 as shown in FIG. 17.

Next, a description will be given of a fifth embodiment of the perpendicular magnetic recording medium according to the present invention. First, two kinds of recording media 1A and 1G are made by forming the CoCr/NiFe stacked structure on the Al substrate which is subjected to the alumite surface processing by use of a sputtering process. The under layers 4A and 4G are formed under the following condition [3], and the CoCr recording layer 5 having a thickness of 0.15 µm and a perpendicular coercivity of 1000 Oe is formed on each of the under layers 4A and 4G.

| Condition [3] | |
| --- | --- |
| Sputtering System: | Planar Magnetron |
| Target: | |
| Medium 1A | Fe-81 wt% Ni (6 inch diameter) |
| Medium 1G | Fe-80 wt% Ni (6 inch diameter) |
| RF Power: | 1 kW |
| Ar Ambient Pressure: | 2 mTorr (Medium 1A) |
| | 3 mTorr (Medium 1G) |
| Substrate Temperature: | 60° C. (Medium 1A) |
| | 100° C. (Medium 1G) |
| Thickness of Layer 4B: | 0.5 µm |

Figure 22:
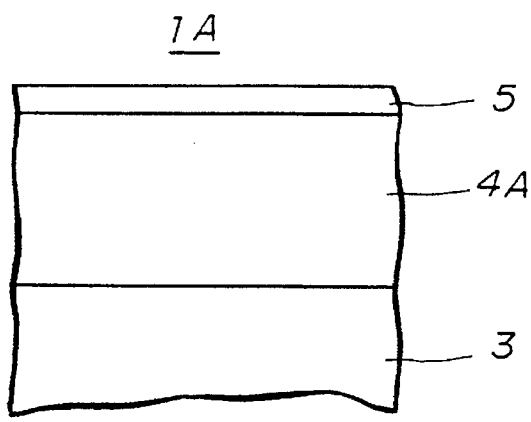
FIG. 22 is a cross sectional view showing an essential part of a conventional perpendicular magnetic recording medium.
Figure 23:
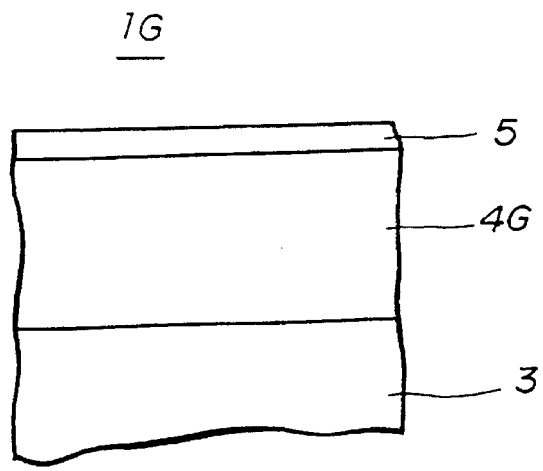
FIG. 23 is a cross sectional view showing an essential part of a fifth embodiment of the perpendicular magnetic recording medium according to the present invention.
Figure 24A:
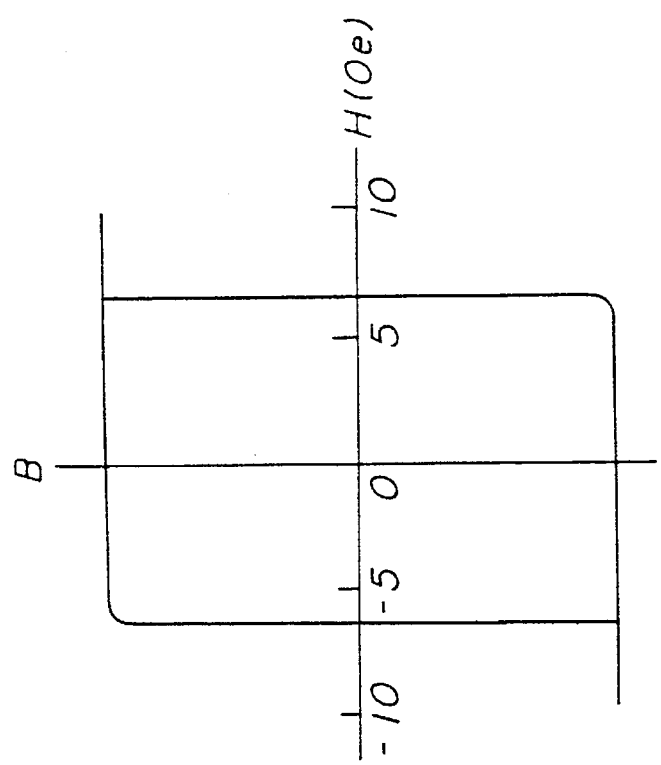
FIGS. 24A and 24B respectively show B-H characteristics of under layers of the perpendicular magnetic recording media shown in FIGS. 22 and 23.
Figure 24B:
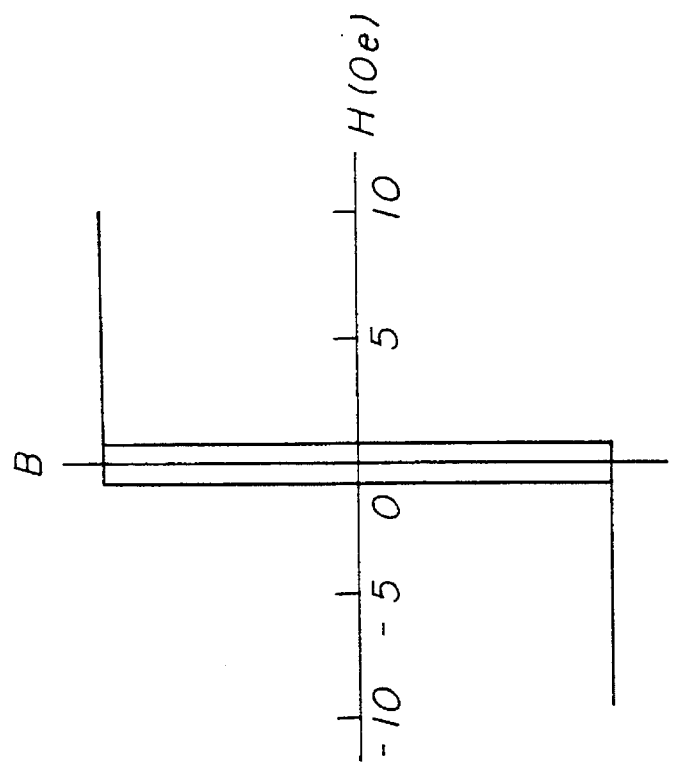

The recording medium 1A shown in FIG. 22 corresponds to the conventional perpendicular magnetic recording medium, and the recording medium 1G shown in FIG. 23 corresponds to the fifth embodiment of the invention. The recording media 1A and 1G differ in that the coercivity of the under layer 4G is different from that of the under layer 4A. FIG. 24A shows a B-H characteristic of the under layer 4A of the recording medium 1A, and FIG. 24B shows a B-H characteristic of the under layer 4G of the recording medium 1G. The coercivity of the recording medium 1A is 0.8 Oe, while the coercivity of the recording medium 1G is 6.5 Oe which is greater than the stray magnetic field within the magnetic recording apparatus. It was confirmed by use of the Kerr-effect microscope that the domain walls of the under layer 4A of the recording medium 1A move due to an external magnetic field of 2 Oe which is less than the stray magnetic field within the magnetic recording apparatus. On the other hand, it was confirmed that the motion of the domain walls of the under layer 4G of the recording medium 1G is suppressed even when the external magnetic field is greater than the stray magnetic field.

FIG. 25A shows the waveform of a signal which is reproduced from one track turn of the recording medium 1A when a signal having a constant level is recorded, and FIG. 26A shows the waveform of a signal which is reproduced from the same one track turn of the recording medium 1A when an external magnetic field of 3 Oe is applied on the recording medium 1A from directly above the single pole head during the reproduction. On the other hand, FIG. 25B shows the waveform of a signal which is reproduced from one track turn of the recording medium 1G when a signal having a constant level is recorded, and FIG. 26B shows the waveform of a signal which is reproduced from the same one track turn of the recording medium 1G when an external magnetic field of 6 Oe is applied on the recording medium 1G from directly above the single pole head during the reproduction. As may be seen from FIGS. 25A, 25B, 26A and 26B, the recorded information on the recording medium 1A is partially erased in response to the external magnetic field of 3 Oe, but no erasure of the recorded information takes place in the case of the recording medium 1G even when the external magnetic field of 6 Oe is applied. Hence, the erasure of the recorded information on the recording medium 1G due to the stray magnetic field is effectively suppressed.

Figure 27:
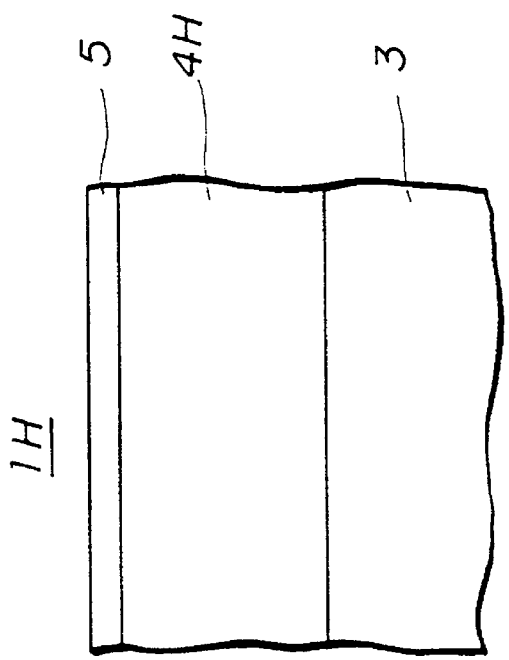
FIG. 27 is a cross sectional view showing an essential part of a perpendicular magnetic recording medium in which the under layer has a magnetic anisotropy with the axis of easy magnetization arranged in the radial direction.
Figure 28:
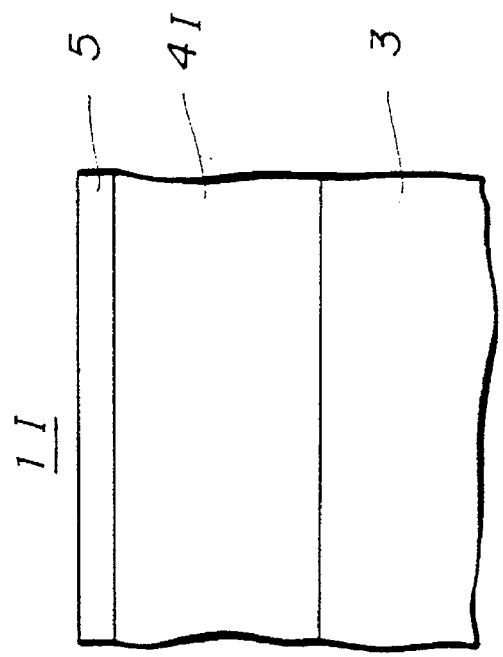
FIG. 28 is a cross sectional view showing an essential part of a sixth embodiment of the perpendicular magnetic recording medium according to the present invention.
Figure 29B:
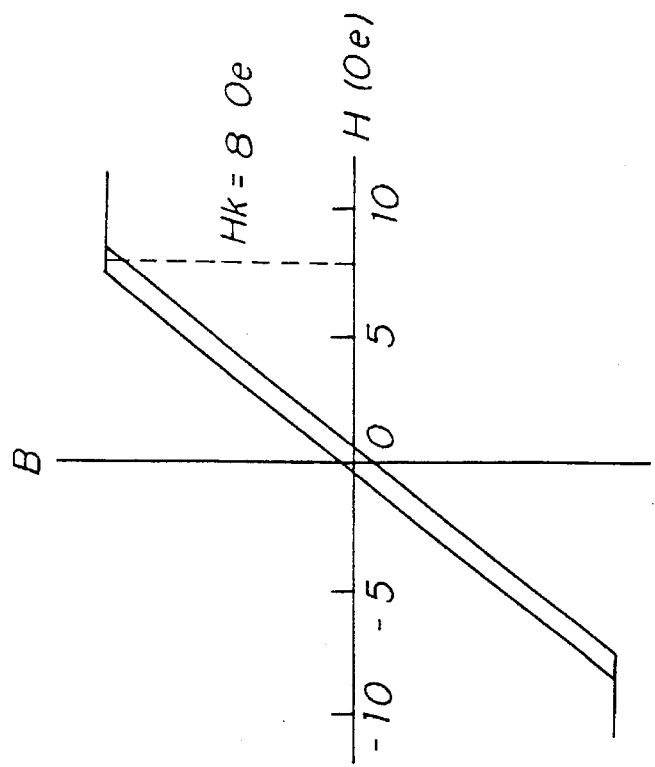
FIGS. 29A and 29B respectively show B-H characteristics of under layers of the perpendicular magnetic recording media shown in FIGS. 27 and 28 in the circumferential direction.
Figure 29A:
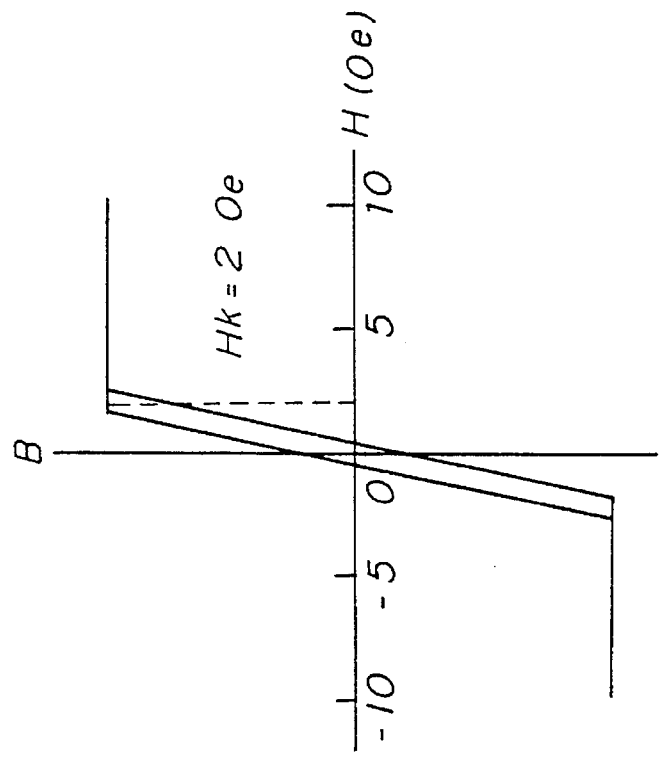

Next, a description will be given of a sixth embodiment of the perpendicular magnetic recording medium according to the present invention. Recording media 1H and 1I respectively shown in FIGS. 27 and 28 are made by sputtering the respective under layers 4H and 4I under the condition described before in conjunction with the fifth embodiment, that is, in a state where a magnetic field is applied in the radial direction as in the case of the recording medium 1A. The recording medium 1I corresponds to the sixth embodiment. The under layers 4H and 4I of the recording media 1H and 1I are given a magnetic anisotropy with the axis of easy magnetization arranged in the radial direction. As a result, the B-H characteristics of the recording media 1H and 1I in the circumferential direction respectively become as shown in FIGS. 29A and 29B and show the rotation magnetization mode.

The recording medium 1H is produced under a weak magnetic field, and thus, the anisotropic magnetic field is 2 Oe which is less than the stray magnetic field within the magnetic recording apparatus. On the other hand, the recording medium 1I is produced under a strong magnetic field, and the anisotropic magnetic field is 8 Oe which is large compared to the stray magnetic field within the magnetic recording apparatus. Therefore, in the case of the recording medium 1H, it was confirmed by use of the Kerr-effect microscope that the domain walls of the under layer 4H move in response to the external magnetic field of 3 Oe. However, in the case of the recording medium 1I, it was confirmed that the motion of the domain walls of the under layer 4I is suppressed even when the external magnetic field is greater than 5 Oe.

Figure 30A:
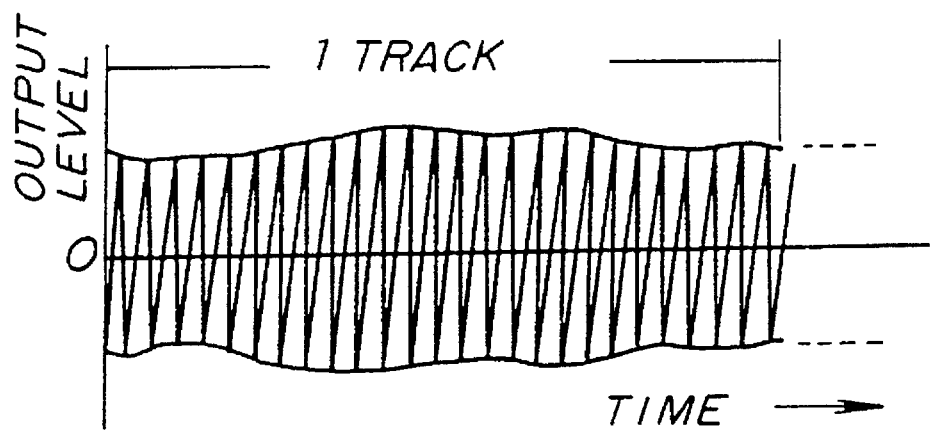
FIG. 30A shows a waveform of a signal reproduced from one track turn of the perpendicular magnetic recording medium shown in FIG. 27.
Figure 30B:
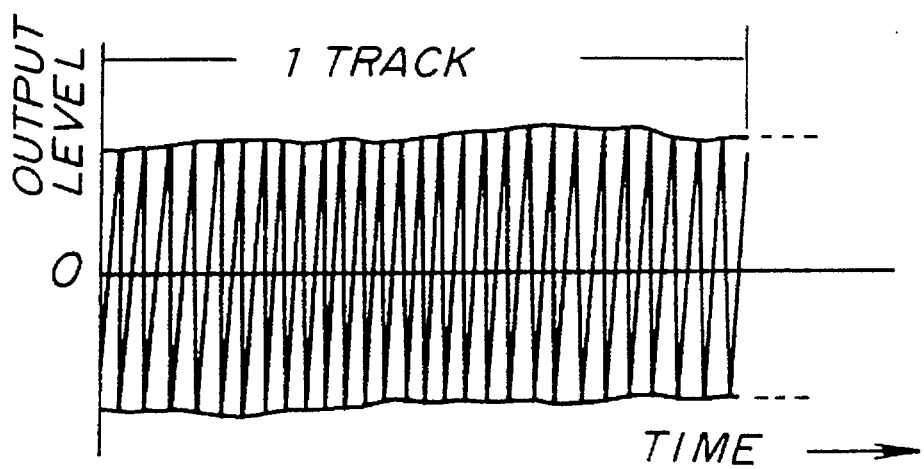
FIG. 30B shows a waveform of a signal reproduced from one track turn of the perpendicular magnetic recording medium shown in FIG. 28.
Figure 31A:
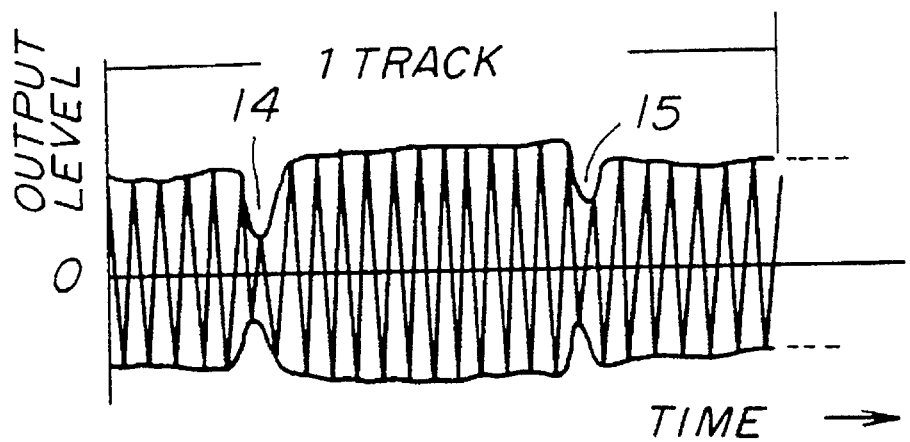
FIG. 31A shows a waveform of a signal reproduced from the same one track turn of the perpendicular magnetic recording medium shown in FIG. 27 under an external magnetic field of 3 Oe.
Figure 31B:
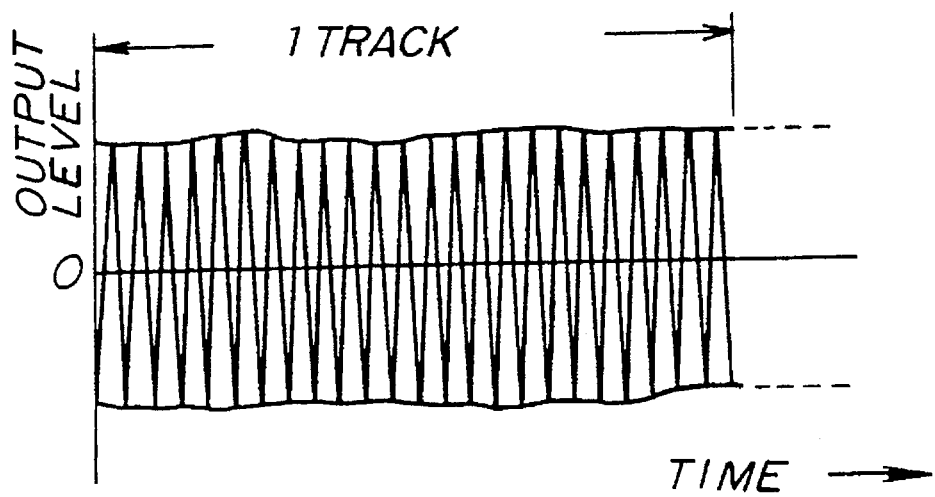
FIG. 31B shows a waveform of a signal reproduced from the same one track turn of the perpendicular magnetic recording medium shown in FIG. 28 under an external magnetic field of 6 Oe.

FIG. 30A shows the waveform of a signal which is reproduced from one track turn of the recording medium 1H when a signal having a constant level is recorded, and FIG. 31A shows the waveform of a signal which is reproduced from the same one track turn of the recording medium 1H when an external magnetic field of 3 Oe is applied on the recording medium 1H from directly above the single pole head during the reproduction. On the other hand, FIG. 30B shows the waveform of a signal which is reproduced from one track turn of the recording medium 1I when a signal having a constant level is recorded, and FIG. 31B shows the waveform of a signal which is reproduced from the same one track turn of the recording medium 1I when an external magnetic field of 6 Oe is applied on the recording medium 1I from directly above the single pole head during the reproduction. As may be seen from FIGS. 30A, 30B, 31A and 31B, the recorded information on the recording medium 1H is partially erased in response to the external magnetic field of 3 Oe, but no erasure of the recorded information takes place in the case of the recording medium 1I even when the external magnetic field of 6 Oe is applied. Hence, the erasure of the recorded information on the recording medium 1I due to the stray magnetic field is effectively suppressed.

Figure 33:
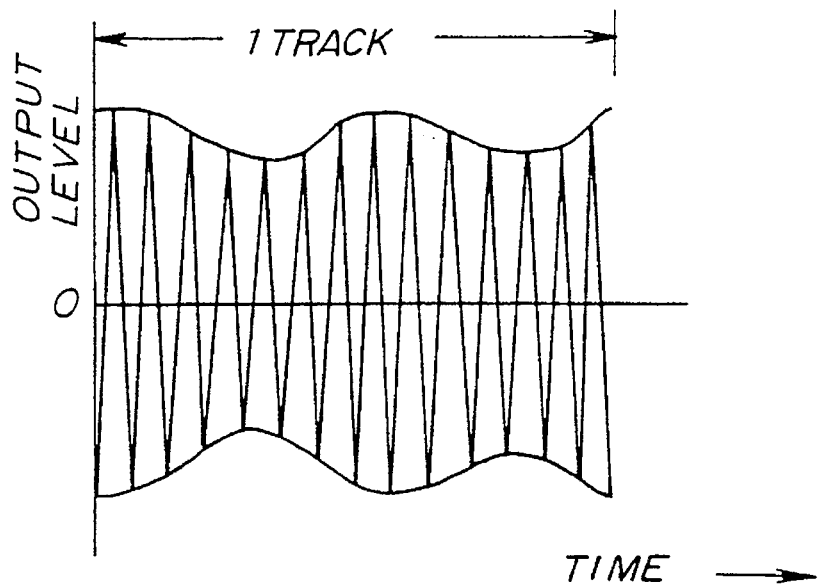
FIG. 33 shows a waveform reproduced from the perpendicular magnetic recording medium shown in FIG. 32.
Figure 32:
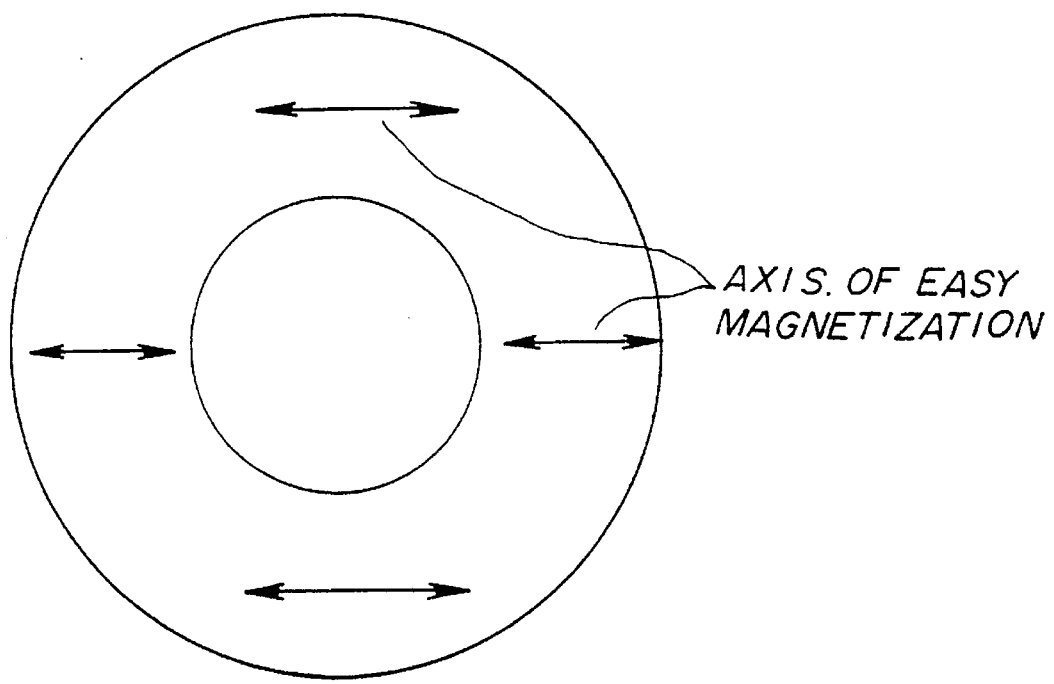
FIG. 32 is a plan view showing a perpendicular magnetic recording medium in which the axis of easy magnetization is fixed in one direction.

In this embodiment, the magnetic anisotropy given to the under layer 4I is such that the axis of easy magnetization is arranged in the radial direction of the recording medium 1I. However, the anisotropic direction is not limited to such and may be arranged otherwise as long as the anisotropic direction is in-plane. But when the angle formed between the track and the anisotropic direction changes on the same track, the recording and reproduction efficiency changes and the envelope of the reproduced signal waveform deteriorates. For example, FIG. 33 shows the signal waveform reproduced from the recording medium when the anisotropic direction, that is, the axis of easy magnetization, is fixed in one direction as shown in FIG. 32, and it is evident from FIG. 33 that the envelope is deteriorated. Accordingly, it is desirable that the magnetic anisotropy makes the angle between the axis of easy magnetization and the track always constant at any position on the same track.

Figure 34:
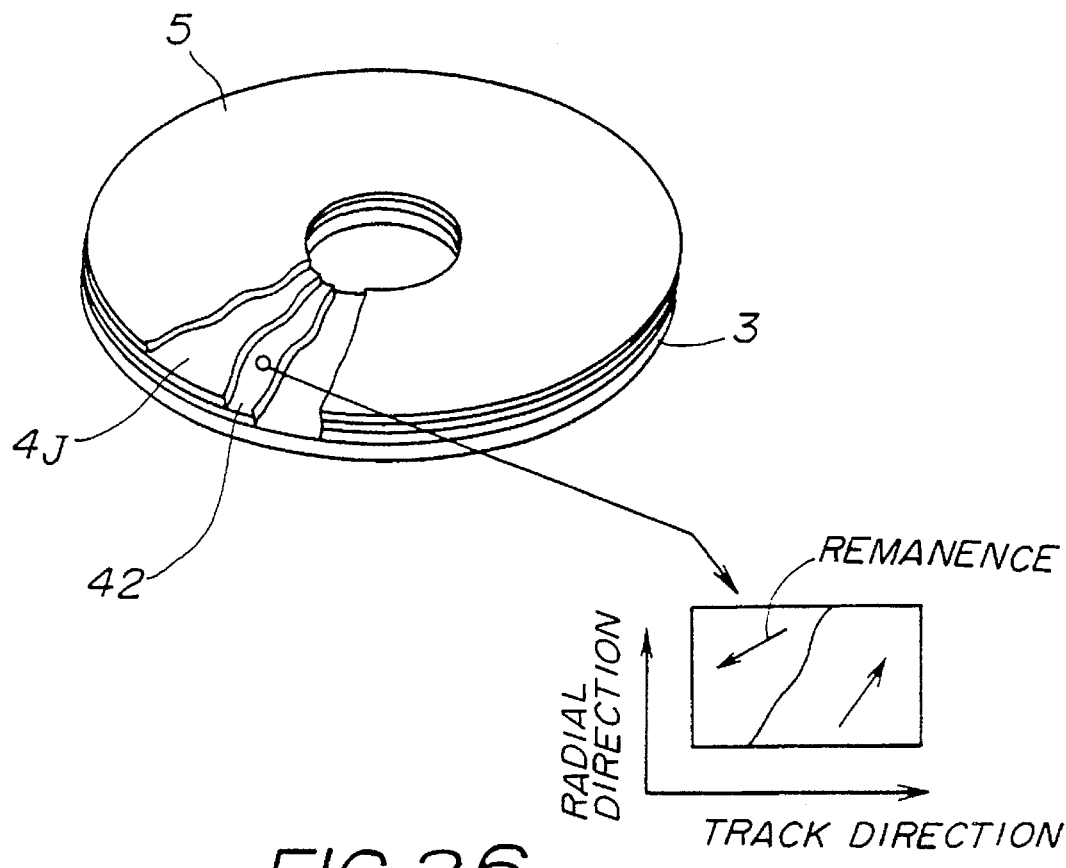
FIGS. 34 and 35 are perspective views respectively showing seventh and eighth embodiments of the perpendicular magnetic recording medium according to the present invention.
Figure 36:
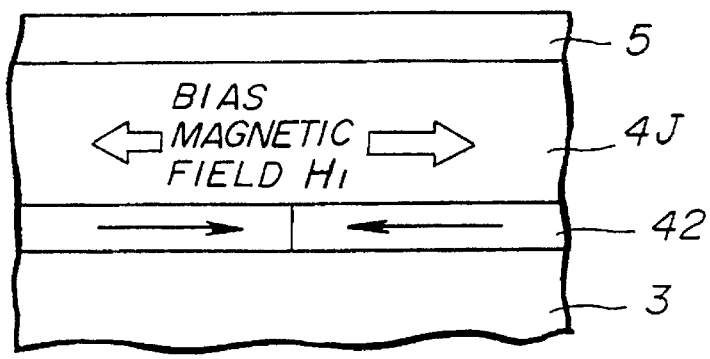
FIGS. 36 and 37 are cross sectional views respectively showing an essential part of the perpendicular magnetic recording media shown in FIGS. 34 and 35.
Figure 35:
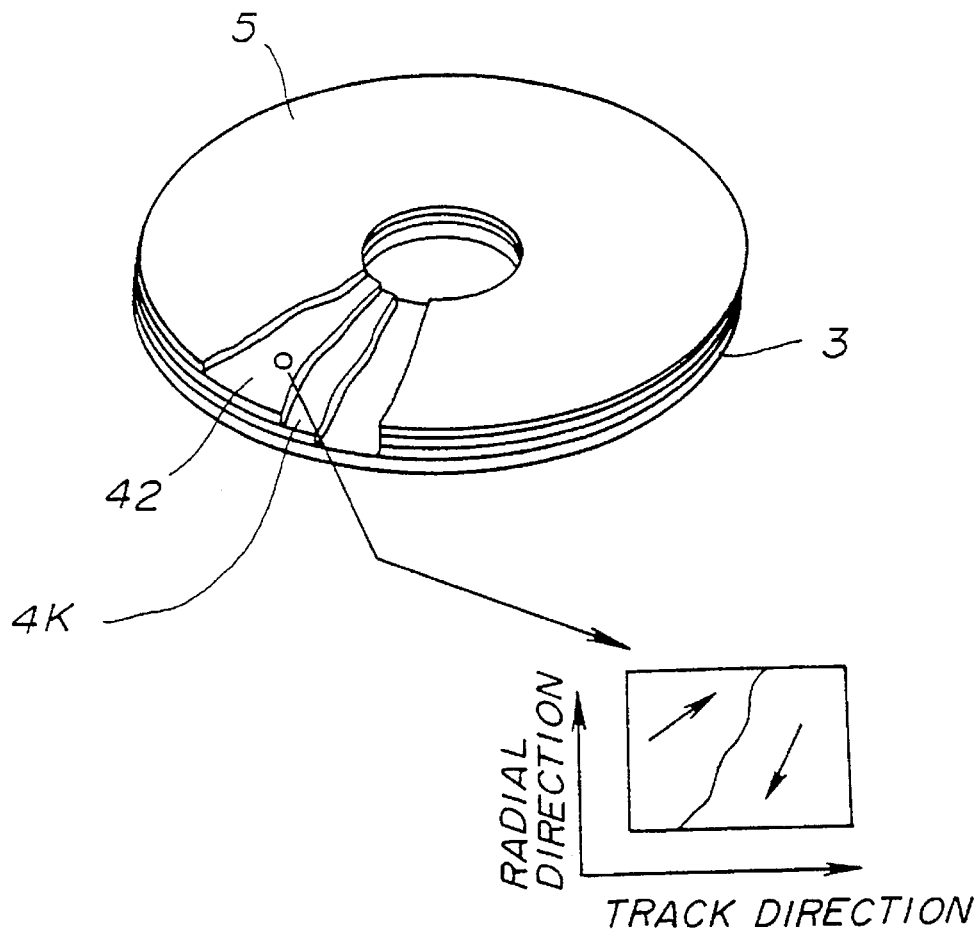
Figure 37:
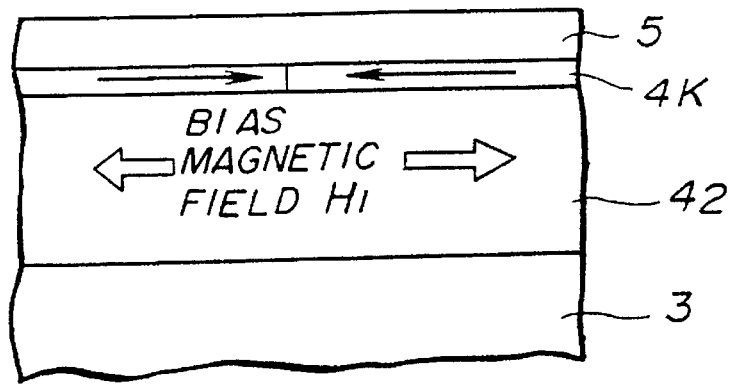

FIGS. 34 and 35 respectively show seventh and eighth embodiments of the perpendicular magnetic recording medium which is produced by use of the sputtering. FIGS. 36 and 37 respectively show cross sections of an essential part of the seventh and eighth embodiments. A recording medium 1J shown in FIG. 34 includes the Al substrate 3 which is subjected to the alumite surface processing, the NiFe (permalloy) soft magnetic under layer 4J having a permeability of 1500 and a thickness of 2 μm, a CoCr recording layer 5 which has a thickness of 0.15 μm and a perpendicular coercivity of 1000 Oe, and a hard magnetic layer 42. A recording medium 1K shown in FIG. 35 has a structure similar to that of the recording medium 1J, except that the recording medium 1K includes an under layer 4K in place of the under layer 4J.

In the recording medium 1J, the hard magnetic layer 42 is provided between the substrate 3 and the under layer 4J. On the other hand, in the recording medium 1K, the hard magnetic layer 42 is provided between the under layer 4K and the recording layer 5. The hard magnetic layer 42 is made of FeCo and has a thickness of 0.02 μm and a coercivity of 80 Oe. In addition, during the normal sputtering process in which this hard magnetic layer 42 is formed, the direction of the residual magnetization is not restricted and does not become uniform.

A bias magnetic field H1 in the horizontal direction is applied to the under layers 4J and 4K by the hard magnetic layer 42 which is formed on the lower surface of the under layer 4J or on the upper surface of the under layer 4K. As a result, the generation of the crosstie wall which easily causes the random motion of the domain walls in the under layers 4J and 4K is suppressed. In addition, the under layers 4J and 4K are given an in-plane (horizontal) anisotropy which corresponds to the residual magnetization direction of the hard magnetic layer 42.

It was confirmed by use of the Kerr-effect microscope that the motion of the domain walls is suppressed in the under layers 4J and 4K of the recording media 1J and 1K even when the external magnetic field is greater than 5 Oe.

Figure 38B:
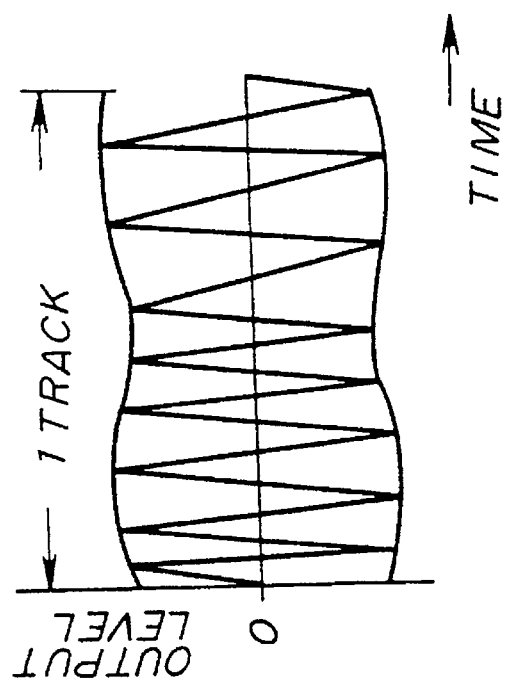
FIG. 38B shows a waveform of a signal reproduced from the same one track turn of the perpendicular magnetic recording medium shown in FIG. 34 under an external magnetic field of 10 Oe.
Figure 38A:
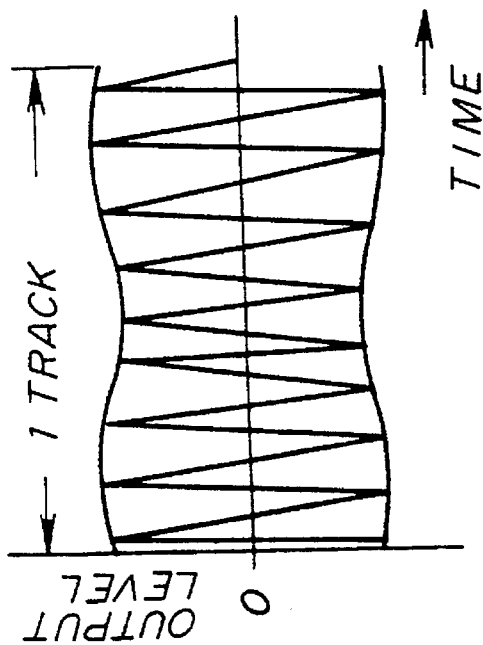
FIG. 38A shows a waveform of a signal reproduced from one track turn of the perpendicular magnetic recording medium shown in FIG. 34.
Figure 39A:
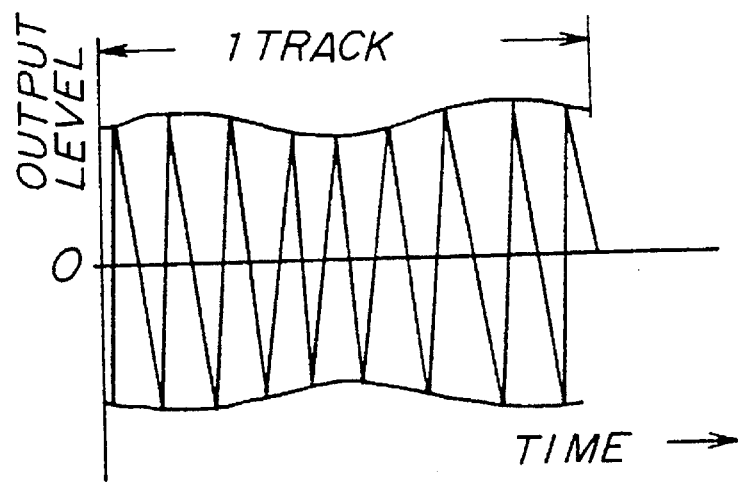
FIG. 39A shows a waveform of a signal reproduced from one track turn of the perpendicular magnetic recording medium shown in FIG. 35.
Figure 39B:
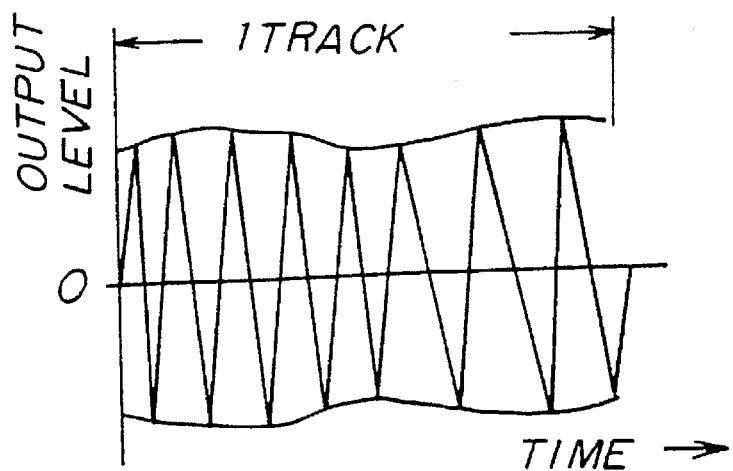
FIG. 39B shows a waveform of a signal reproduced from the same one track turn of the perpendicular magnetic recording medium shown in FIG. 35 under an external magnetic field of 10 Oe.

FIG. 38A shows the waveform of a signal which is reproduced from one track turn of the recording medium 1J when a signal having a constant level is recorded, and FIG. 38B shows the waveform of a signal which is reproduced from the same one track turn of the recording medium 1J when an external magnetic field of 10 Oe is applied on the recording medium 1J from directly above the single pole head during the reproduction. On the other hand, FIG. 39A shows the waveform of a signal which is reproduced from one track turn of the recording medium 1K when a signal having a constant level is recorded, and FIG. 39B shows the waveform of a signal which is reproduced from the same one track turn of the recording medium 1K when an external magnetic field of 10 Oe is applied on the recording medium 1K from directly above the single pole head during the reproduction. As may be seen from FIGS. 38A, 38B, 39A and 39B, no erasure of the recorded information takes place in the recording media 1J and 1K even when the external magnetic field of 10 Oe is applied. Hence, the erasure of the recorded information on the recording media 1J and 1K due to the stray magnetic field is effectively suppressed.

However, in the recording medium in which the residual magnetization direction is not uniform, the direction of the magnetic anisotropy of the soft magnetic under layer induced by the bias magnetic field is not constant at each of the positions on the same track. For this reason, the recording and reproduction efficiency changes, and the envelope of the reproduced signal waveform deteriorates.

Figure 40:
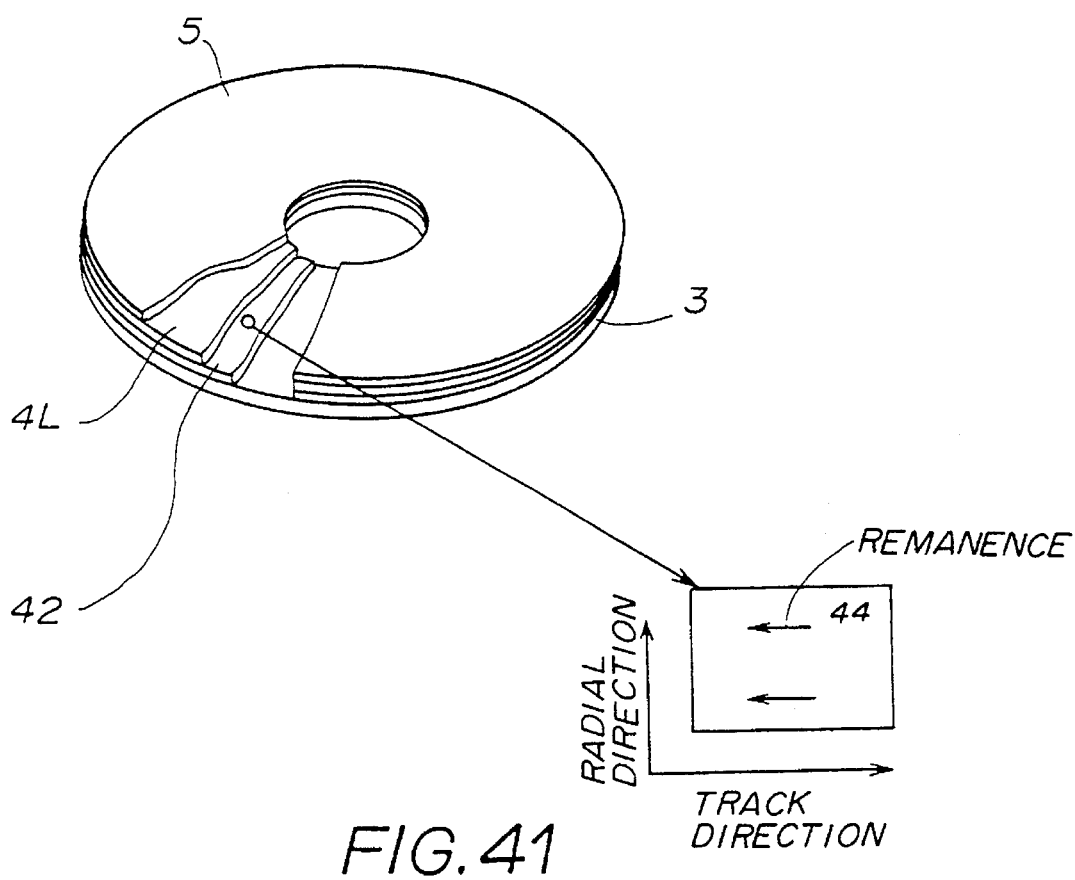
FIG. 40 is a perspective view showing a ninth embodiment of the perpendicular magnetic recording medium according to the present invention.
Figure 41:
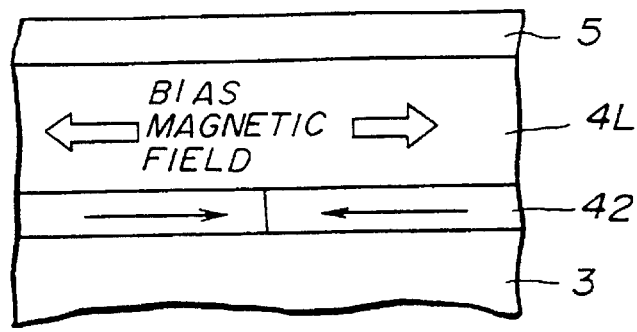
FIG. 41 is a cross sectional view showing an essential part of the perpendicular magnetic recording medium shown in FIG. 40.

Next, a description will be given of a ninth embodiment of the perpendicular magnetic recording medium according to the present invention, in which the above described problems are overcome. FIG. 40 shows the ninth embodiment, and FIG. 41 shows a cross section of an essential part of the ninth embodiment. A recording medium 1L shown in FIG. 40 has a structure identical to that of the recording medium 1J described above. However, as indicated by an arrow 44 in FIG. 40, the residual magnetization direction of the hard magnetic layer 42 of the recording medium 1L is arranged in-plane in the circumferential direction (direction of the tracks). Accordingly, the direction of the magnetic anisotropy induced in an under layer 4L of the recording medium 1L due to a bias magnetic field H2 of the hard magnetic layer 42 becomes approximately constant at each position on the track which is formed on the recording layer 5, and no change occurs in the recording and reproduction efficiency. The residual magnetization direction of the hard magnetic layer 42 is controlled by applying an external magnetic field.

Figure 42A:
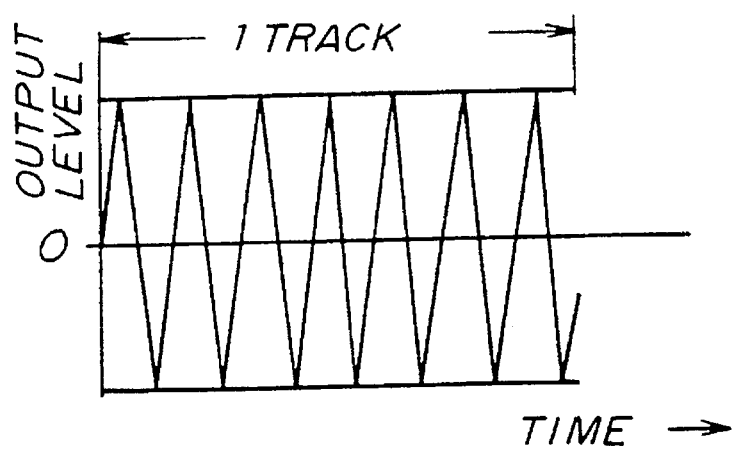
FIG. 42A shows a waveform of a signal reproduced from one track turn of the perpendicular magnetic recording medium shown in FIG. 40.
Figure 42B:
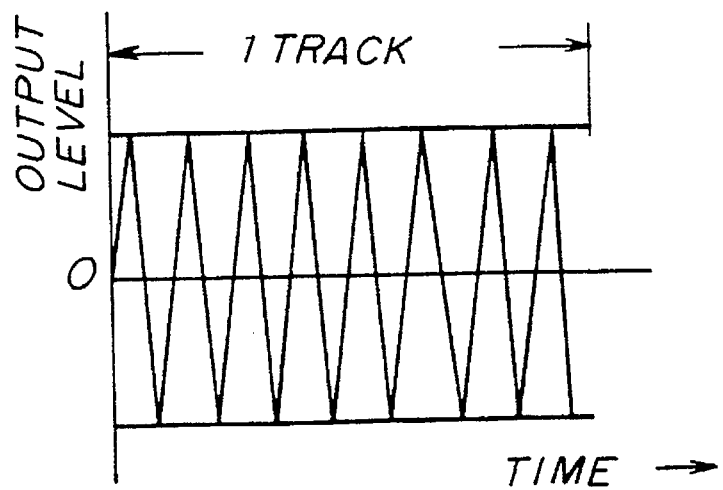
FIG. 42B shows a waveform of a signal reproduced from the same one track turn of the perpendicular magnetic recording medium shown in FIG. 40 under an external magnetic field of 10 Oe.

FIG. 42A shows the waveform of a signal which is reproduced from one track turn of the recording medium 1L when a signal having a constant level is recorded, and FIG. 42B shows the waveform of a signal which is reproduced from the same one track turn of the recording medium 1L when an external magnetic field of 10 Oe is applied on the recording medium 1L from directly above the single pole head during the reproduction. As may be seen from FIGS. 42A and 42B, the envelope of the reproduced signal waveform is improved, and no erasure of the recorded information takes place in the recording medium 1L even when the external magnetic field of 10 Oe is applied. Hence, the erasure of the recorded information on the recording medium 1L due to the stray magnetic field is effectively suppressed.

In the above described embodiments, the axis of easy magnetization matches the direction of the tracks. However, similar effects are obtainable as long as the axis of easy magnetization is arranged in a fixed position with respect to the direction of the tracks at any position on the track. For example, the axis of easy magnetization may be set in the radial direction of the recording medium. In addition, the hard magnetic layer 42 is not limited to FeCo and other hard magnetic materials may be used for the hard magnetic layer 42. For example, the hard magnetic layer 42 may be made of CoNi which has a thickness of 0.02 μm and a coercivity of 100 Oe.

Figure 43:
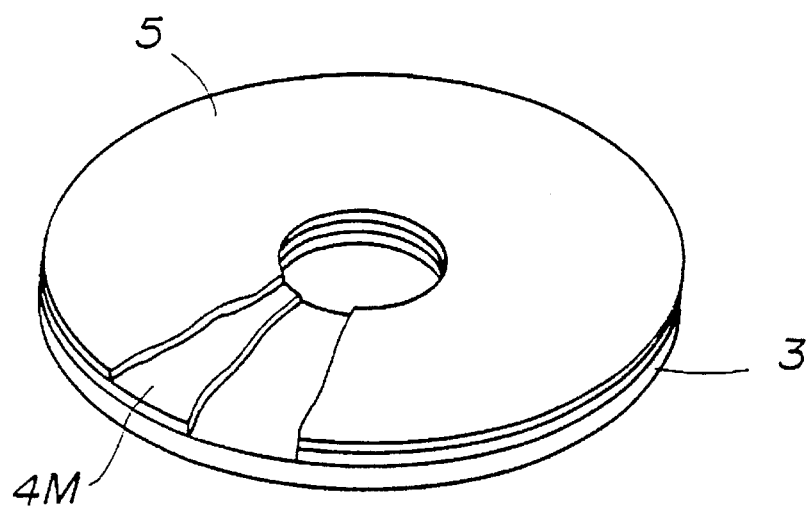
FIG. 43 is a perspective view showing a tenth embodiment of the perpendicular magnetic recording medium according to the present invention.
Figure 44:
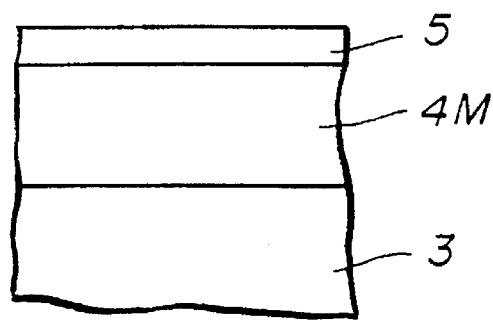
FIG. 44 is a cross sectional view showing an essential part of the perpendicular magnetic recording medium shown in FIG. 43.

Next, a description will be given of a tenth embodiment of the perpendicular magnetic recording medium according to the present invention, by referring to FIGS. 43 and 44. FIG. 43 shows a recording medium 1M, and FIG. 44 shows a cross section of an essential part of the recording medium 1M on an enlarged scale. The recording medium 1M includes the Al substrate 3 which is subjected to the alumite surface processing, a NiFe (Fe-81 wt % Ni) under layer 4M having a thickness of 1 μm and a permeability of 800, and the CoCr recording layer 5 which has a thickness of 0.15 μm and a coercivity of 1000 Oe.

Figure 45:
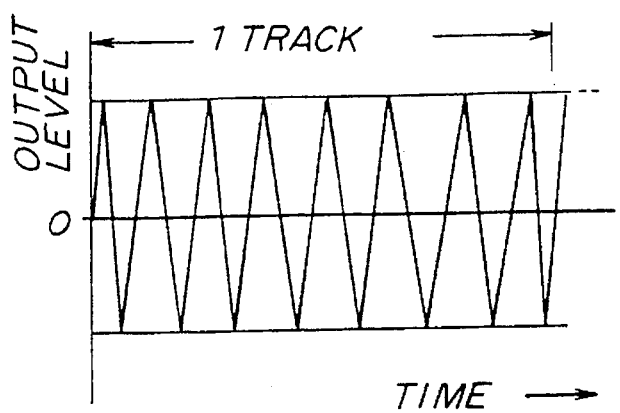
FIG. 45 shows a waveform of a signal reproduced from one track turn of the perpendicular magnetic recording medium shown in FIG. 43 under an external magnetic field of 10 Oe.

FIG. 45 shows the waveform of a signal which is reproduced from the one track turn of the recording medium 1M when an external magnetic field of 10 Oe is applied on the recording medium 1M from directly above the single pole head during the reproduction. As may be seen from FIG. 45, no erasure of the recorded information takes place in the recording medium 1M even when the external magnetic field of 10 Oe is applied. Hence, the erasure of the recorded information on the recording medium 1M due to the stray magnetic field is effectively suppressed.

Figure 5:
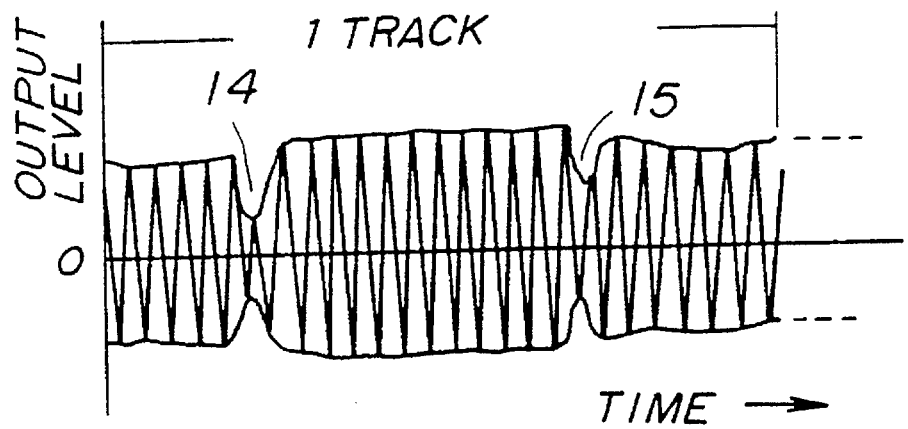
FIG. 5 shows a waveform of a signal reproduced from the one track turn of the perpendicular magnetic recording medium shown in FIG. 2 under an external magnetic field of 3 Oe.

In addition, as may be seen by comparing FIGS. 45 and 5, there is no decrease in the output signal level in FIG. 45 and approximately the same output signal level can be obtained as in the conventional case. Similar effects can be obtained when the thickness of the under layer 4M is 1 μm or greater and the permeability is in the range of 50 to 800.

Figure 14:
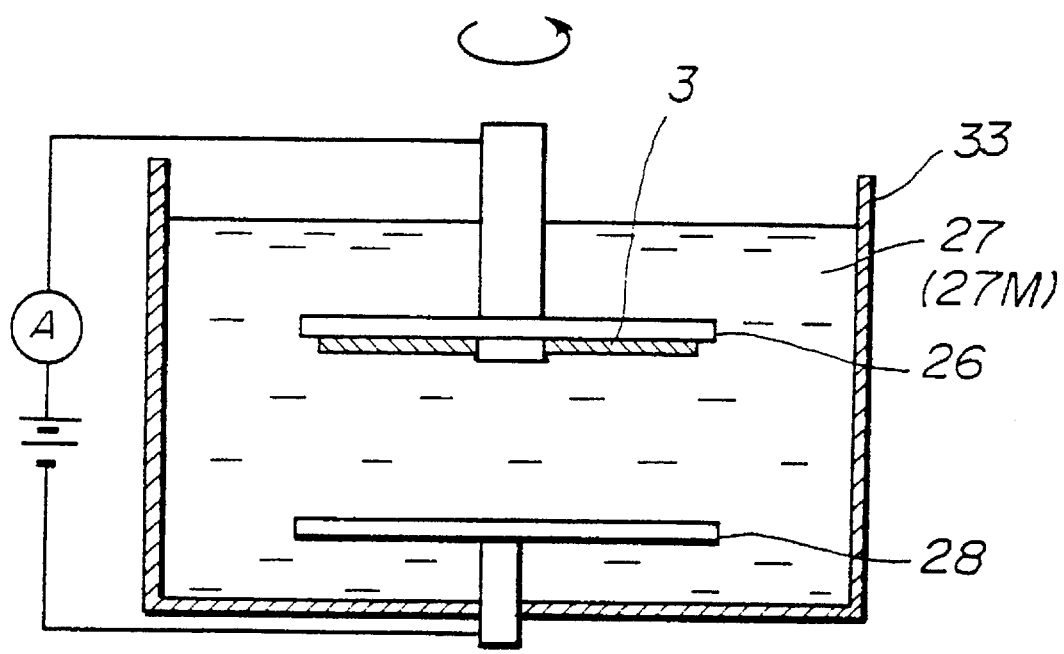
FIG. 14 is a cross sectional view generally showing a plating apparatus.

For example, the plating apparatus shown in FIG. 14 may be used to form the under layer 4M which has a permeability of 800. In this case, a NiFe conductor layer having a thickness of 1000 Å is sputtered on the substrate 3 beforehand. The substrate 3 is supported on the substrate holder 26 and positioned to confront the plating electrode 28 within the plating chamber 33 which is filled with a plating solution 27M. This plating solution 27M includes nickel sulfate (NiSo$_4$, 6H$_2$O) and ferrous sulfate (FeSO$_4$, 7H$_2$O) as the main components and has a pH of 2. The substrate 3 is rotated at 170 rpm within the plating chamber 33. In this state, the current density is 6 A/dm$^2$ and the chamber temperature is 40° C. By carrying out the electroplating under these conditions, it is possible to form the NiFe under layer 4M having the permeability of 800 on the NiFe conductor layer.

By changing the chamber temperature, it is possible to form an under layer having different permeabilities. For example, it is possible to form an under layer having a permeability of 2000 at the chamber temperature of 35° C., and it is possible to form an under layer having a permeability of 100 at the chamber temperature of 43° C.

In addition, the under layer can of course be formed by sputtering, vapor deposition and the like by appropriately selecting the conditions such as the substrate temperature and the target composition.

Next, a description will be given of an experiment [1] related to the relationship of the permeability of the soft magnetic under layer and the erasure of recorded information due to the stray magnetic field.

As shown in FIG. 46, the thickness of the soft magnetic under layer is fixed at 0.5 μm, and three kinds of perpendicular magnetic recording media ①, ② and ③ respectively having permeabilities of 1500, 800 and 100 were made. The recording medium ① corresponds to the conventional recording medium. The recording and reproduction of information on these recording media were carried out using a single pole head. In addition, an external magnetic field was applied to these recording media during the reproduction from directly above the head.

As may be seen from FIG. 46, it was confirmed that the recorded information on the recording medium ① is partially erased when the external magnetic field is 3 Oe. The extent of the information erasure in this recording medium ① was notable when the external magnetic field is 10 Oe.

On the other hand, it was confirmed that no erasure of recorded information takes place in the case of the recording media ② and ③ even when the external magnetic field is 10 Oe.

Figure 47:
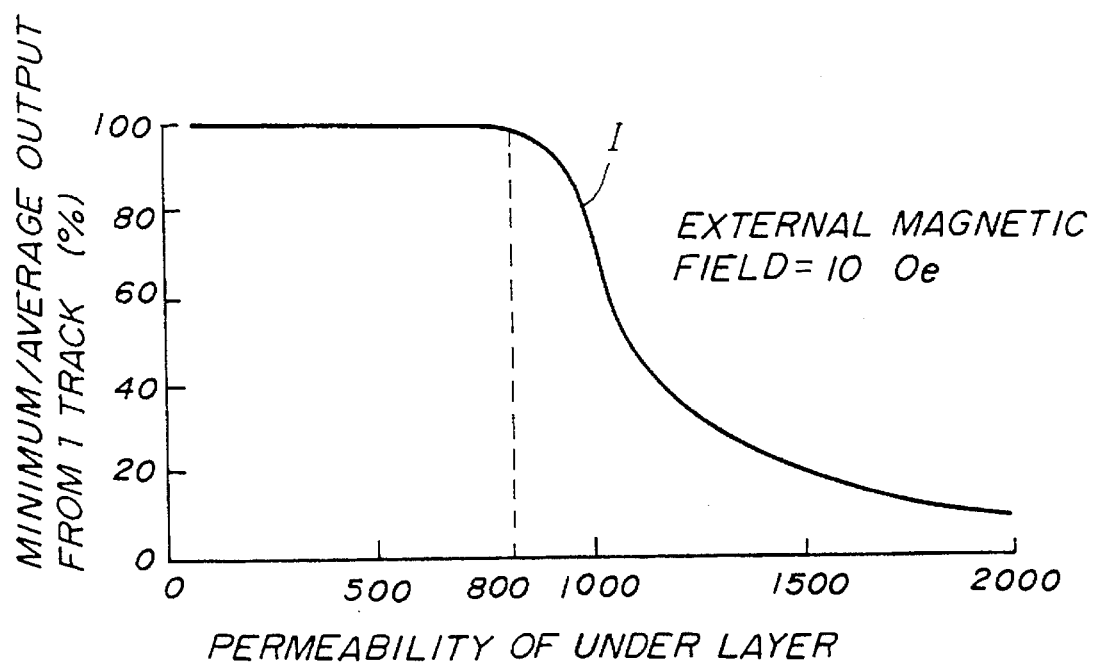
FIG. 47 shows a relationship between the erasure of recorded information and the permeability of the under layer.

Based on the results of the above described experiment [1], FIG. 47 shows a relationship between minimum reproduced output/average reproduced output from one track turn corresponding to one revolution of the recording medium and the permeability of the soft magnetic under layer. As indicated by a line I in FIG. 47, the minimum reproduced output/average reproduced output is 100% when the permeability is 800 or less, and it may be seen that no erasure of recorded information takes place under this condition.

Accordingly, in order to suppress the erasure of recorded information due to the stray magnetic field, it is necessary to set the permeability of the soft magnetic under layer to 800 or less which is considerably small compared to the permeability of 1500 generally used in the conventional recording medium.

However, as may be seen from FIG. 46, another problem arose for the recording media ② and ③. That is, the reproduced output is decreased when the permeability of the soft magnetic under layer is set to 800 or less. Hence, there is a need to overcome this problem under the condition that the permeability of the soft magnetic under layer is 800 or less.

Next, a description will be given of an experiment [2] related to the relationship of the thickness of the soft magnetic under layer and the reproduced output when the permeability of the soft magnetic under layer is set in the order of 100.

As shown in FIG. 48, the permeability of the soft magnetic under layer is fixed to 100 which is less than 800, and two kinds of perpendicular magnetic recording media ④ and ⑤ respectively having thicknesses of 0.5 μm and 2 μm were made. Another perpendicular magnetic recording medium ⑥ was made in which the soft magnetic under layer has a permeability of 50 and a thickness of 20 μm.

The recording and reproduction of information on these recording media were carried out using a single pole head. In addition, an external magnetic field of 10 Oe was applied to these recording media during the reproduction from directly above the head. Two important facts were confirmed from this experiment [2].

First, as confirmed in the experiment [1] described above, no erasure of recorded information takes place in the case of the recording media ④, ⑤ and ⑥.

Second, it was confirmed that the reproduced output increases when the thickness of the soft magnetic under layer is set to 2 μm or 20 μm, which is considerably large compared to the thickness of 0.5 μm which is generally used in the conventional recording medium.

Figure 49:
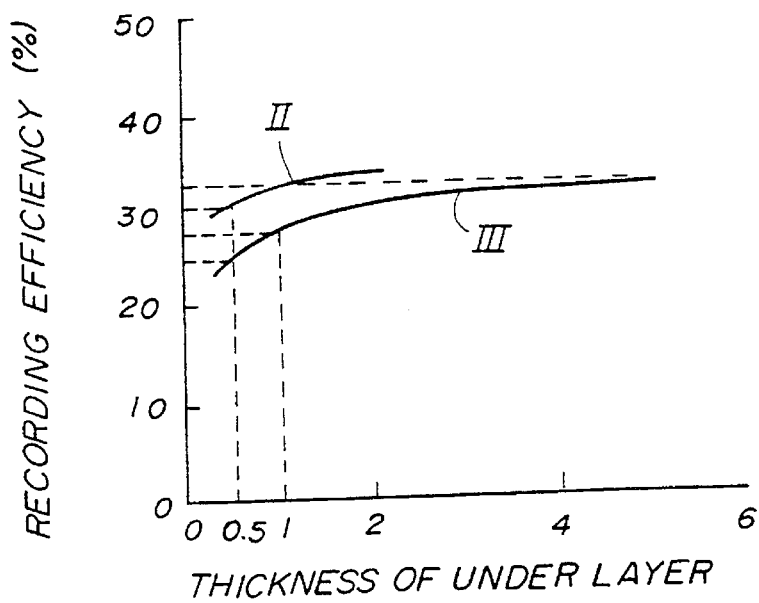
FIG. 49 shows the relationship between the recording efficiency and the thickness of the under layer.

Based on the results of the experiment [2], FIG. 49 shows the relationship between the recording efficiency (effective utilization of the head magnetomotive force) and the thickness of the soft magnetic under layer. In FIG. 49, a line II shows the relationship for the case where the permeability of the soft magnetic under layer is 1500, and a line III shows the relationship for the case where the permeability of the soft magnetic under layer is 100. It may be seen from the line II that the recording efficiency is 30% when the permeability is 1500 and thickness of the soft magnetic under layer is 0.5 μm as in the case of the conventional recording medium. On the other hand, it may be seen from the line III that the recording efficiency gradually increases when the permeability is 100 and the thickness of the soft magnetic under layer is under 4 μm, and that the recording efficiency exceeds the conventional recording efficiency of 30% when the thickness of the soft magnetic under layer exceeds 4 μm. In addition, although the recording efficiency is approximately 25% and insufficient when the thickness of the soft magnetic under layer is 0.5 μm, it was confirmed that the recording efficiency becomes approximately 28% and satisfactory when the thickness is approximately 1 μm. Furthermore, although there is no maximum limit of the thickness of the soft magnetic under layer, it is desirable from the point of view of the production efficiency and production cost that the thickness is 20 μm or less as in the case of the recording medium ⑥.

Accordingly, it is possible to obtain a desired recording efficiency comparable to that of the conventional recording medium when the permeability and thickness of the soft magnetic under layer are respectively set to 800 or less and 1 μm or greater.

Therefore, according to the described embodiments, it is not only possible to suppress the erasure of recorded information on the recording medium but also possible to obtain a sufficiently high recording efficiency. As a result, the reliability and performance of the recorded information on the recording medium are greatly improved.

As a method of giving magnetic anisotropy to a magnetic layer, there is a first known method in which a thin magnetic film is formed under a magnetic field and a second known method in which a magnetic layer is formed after forming a stripe shaped concavo-convex undulation on a substrate (disk). For example, the first known method is proposed in a Japanese Laid-Open Patent Application No. 62-212918, and the second known method is proposed in a Japanese Laid-Open Patent Application No. 62-262217.

However, according to the first known method, it is necessary to provide a magnetic field applying system within a magnetic layer forming apparatus, and there is a problem in that the magnetic layer forming apparatus as a whole becomes expensive. On the other hand, according to the second known method, the stripe shaped concavo-convex is formed on the entire surface of the disk in order to give the magnetic anisotropy. For this reason, a slider which is mounted with a magnetic head which becomes an electromagnetic transducer floats, and the effective spacing thereof relatively to the disk decreases due to the existence of the convex on the disk. As a result, the probability of the head making contact with the disk increases, and the reliability of the system becomes poor.

On the other hand, the present inventors have found through experiments that a soft magnetic under layer formed on a disk substrate may be given a magnetic anisotropy such that the axis of easy magnetization is arranged in the circumferential direction by simply forming a ring-shaped concavo-convex undulation in the circumferential direction of the disk substrate at only a part of the disk substrate.

Next, a description will be given of a first embodiment of a method of producing a perpendicular magnetic recording medium according to the present invention. FIG. 50 shows a cross section of an essential part of a recording medium in which is produced by this embodiment. In this embodiment, a ring-shaped concavo-convex undulation 3N having a surface roughness Ra=3 nm is formed in the circumferential direction on a surface of the Al substrate 3 at only a part of the substrate 3 as shown in FIG. 51. The surface of this substrate 3 is subjected to a Ni plating process and has a diameter of 5 inches. Thereafter, a NiFe soft magnetic under layer 4N is plated on the substrate 3, and the CoCr recording layer 5 is sputtered on the under layer 4N.

The ring-shaped concavo-convex undulation 3N of the recording medium 1N may be realized by use of a polishing tape. In addition, the condition described in conjunction with the tenth embodiment for the permeability of 2000 may be employed for the formation of the under layer 4N. In this embodiment, the under layer 4N has a thickness of 2 μm, and the recording layer 5 has a thickness of 0.15 μm and a coercivity of 1000 Oe.

Figures 52A, 52B:
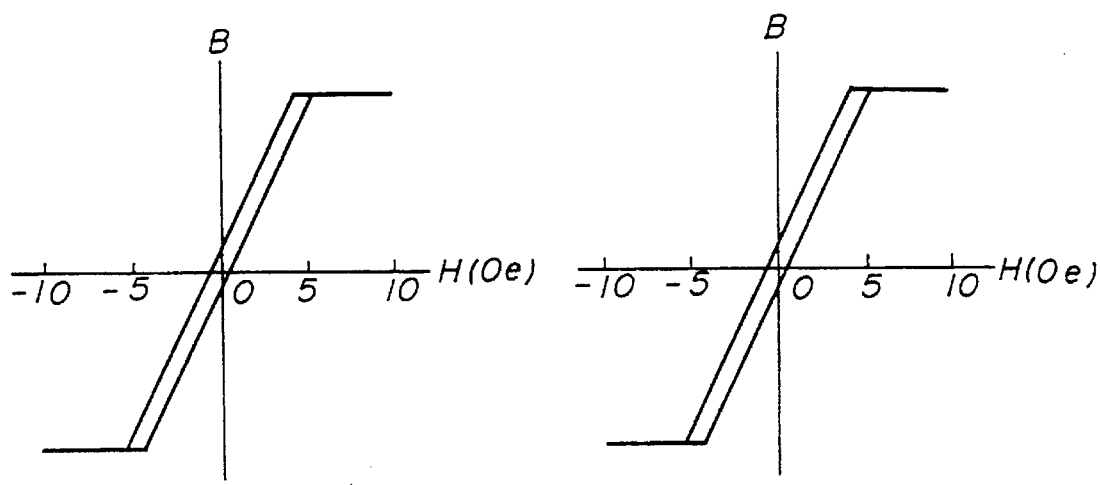
FIGS. 52A and 52B respectively show B-H characteristics of the under layer of the perpendicular magnetic recording medium shown in FIGS. 50 and 51 at parts X and Y.

FIGS. 52A and 52B respectively show magnetic characteristics of the under layer 4N at parts X and Y of the recording medium 1N shown in FIG. 51. As may be seen from FIGS. 52A and 52B, the magnetic anisotropy in which the axis of easy magnetization is arranged in the circumferential direction of the recording medium 1N is obtained. Moreover, the magnetic characteristic at the part X having the concavo-convex undulation 3N and the magnetic characteristic at the part Y having no concavo-convex undulation 3N are approximately the same.

Figures 53A, 53B:
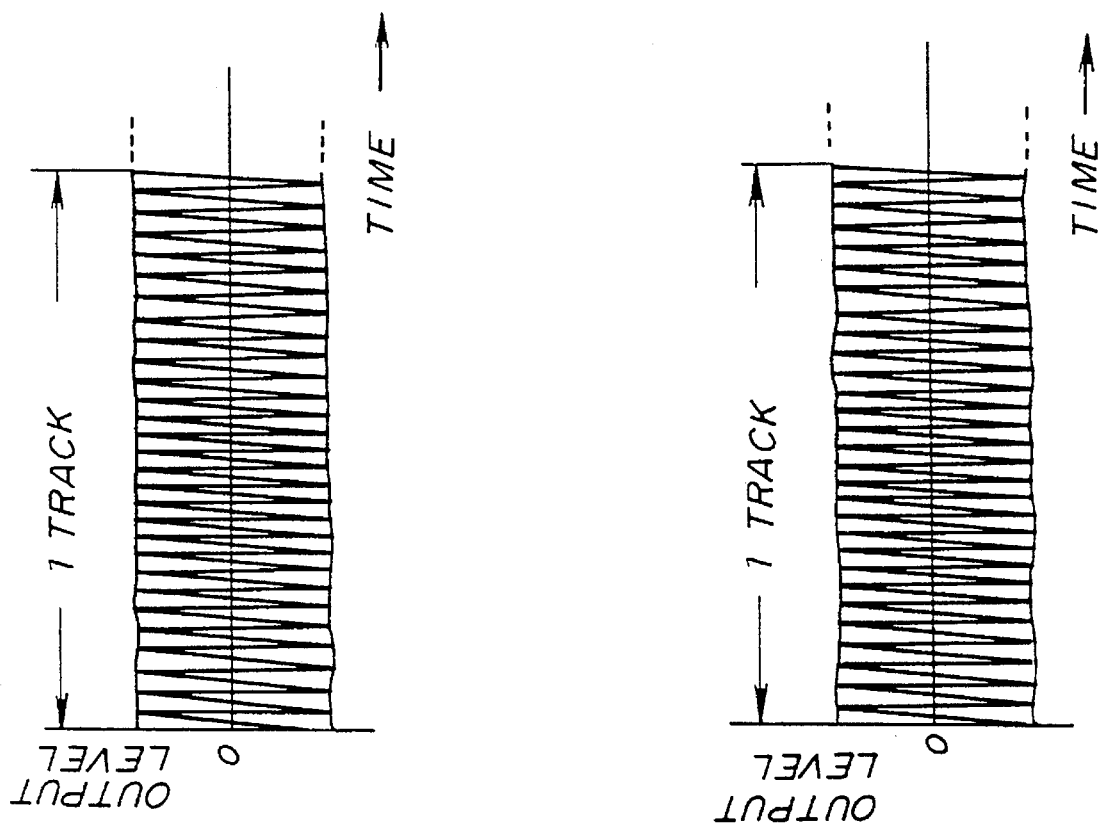
FIG. 53A shows a waveform of a signal reproduced from one track turn of the perpendicular magnetic recording medium shown in FIG. 51.
FIG. 53B shows a waveform of a signal reproduced from the same one track turn of the perpendicular magnetic recording medium shown in FIG. 51 under an external magnetic field of 3 Oe.

FIG. 53A shows the waveform of a signal which is reproduced from one track turn of the recording medium 1N when a signal having a constant level is recorded, and FIG. 53B shows the waveform of a signal which is reproduced from the same one track turn of the recording medium 1N when an external magnetic field of 3 Oe is applied on the recording medium 1N from directly above the single pole head during the reproduction. As may be seen from FIGS. 53A and 53B, no erasure of the recorded information takes place in the recording medium 1N even when the external magnetic field of 3 Oe is applied. Hence, the erasure of the recorded information on the recording medium 1N due to the stray magnetic field is effectively suppressed.

In this embodiment, the concavo-convex undulation 3N is formed on only a part of the substrate 3 to give the magnetic anisotropy, and the deterioration of the floating margin of the magnetic head is suppressed thereby. As a result, it is possible to produce a recording medium having a high reliability. Of course, similar effects can be obtained as long as the ring-shaped concavo-convex undulation is formed at only a part of the recording medium 1N on at least one of the substrate 3 and the under layer 4N.

Although the soft magnetic under layer of the perpendicular magnetic recording medium contributes to the improvement of the recording and reproduction sensitivity, this under layer may become a noise source. When the noise is generated, the S/N ratio becomes poor at the time of the reproduction. Accordingly, in order to improve the S/N ratio, there is a demand to realize a method of producing a perpendicular magnetic recording medium which only has a small noise related to the under layer.

Normally, the under layer is formed on the substrate by a sputtering. In addition, the magnetic recording layer is formed on the under layer by sputtering, to thereby complete the perpendicular magnetic recording medium. However, according to such a production method, the magnetic domains of the under layer are not necessarily arranged to reduce the noise. As a result, the noise increases and the S/N ratio at the time of the reproduction becomes poor.

Accordingly, a description will now be given of a second embodiment of the method of producing the perpendicular magnetic recording medium according to the present invention which enables reduction of the noise related to the soft magnetic under layer.

Figure 54:
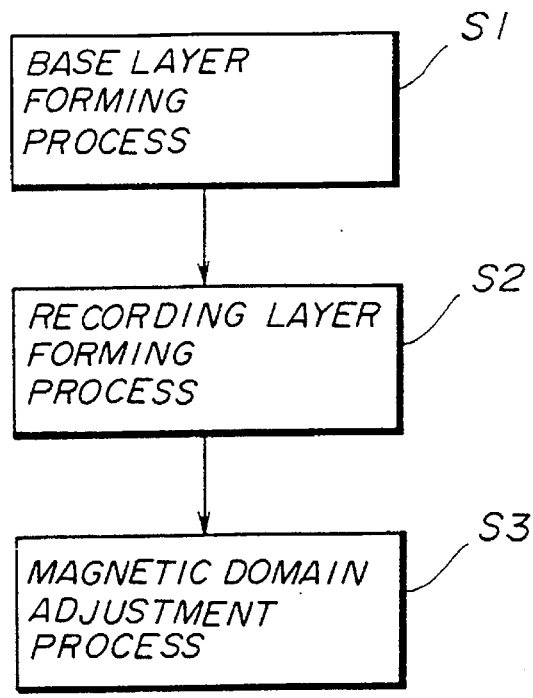
FIG. 54 is a flow chart for explaining a second embodiment of the method of producing the perpendicular magnetic recording medium according to the present invention.

FIG. 54 is a flow chart showing the second embodiment of the method.

First, a description will be given of the method of producing the recording medium having the 2-layer structure.

Figure 55:
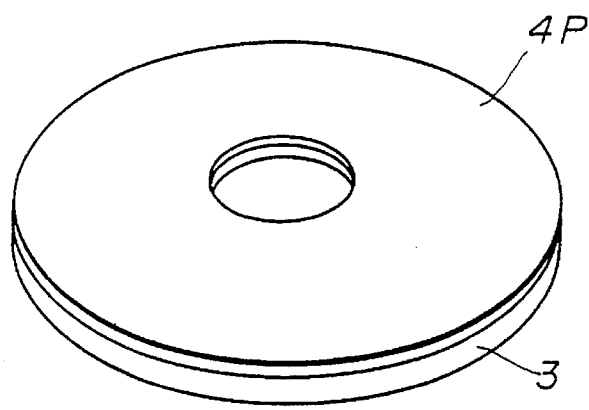
FIG. 55 is a perspective view for explaining a under layer forming process.
Figure 56A:
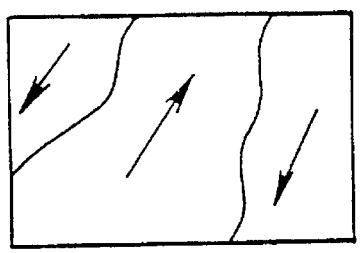
FIGS. 56A and 56B show magnetic domain structures of the under layer.

In a step S1 shown in FIG. 54, NiFe is sputtered on the Al substrate 3 which is subjected to the alumite surface processing, and a soft magnetic under layer 4P is formed on the substrate 3 to a thickness of 2 μm as shown in FIG. 55. The under layer 4P may have a in-plane magnetic domain structure 4Pa shown in FIG. 56A or a stripe magnetic domain structure 4Pb shown in FIG. 56B by controlling the sputtering conditions such as the target composition and the Ar ambient pressure. The direction in which each magnetic domain extends is not specified.

Figure 57:
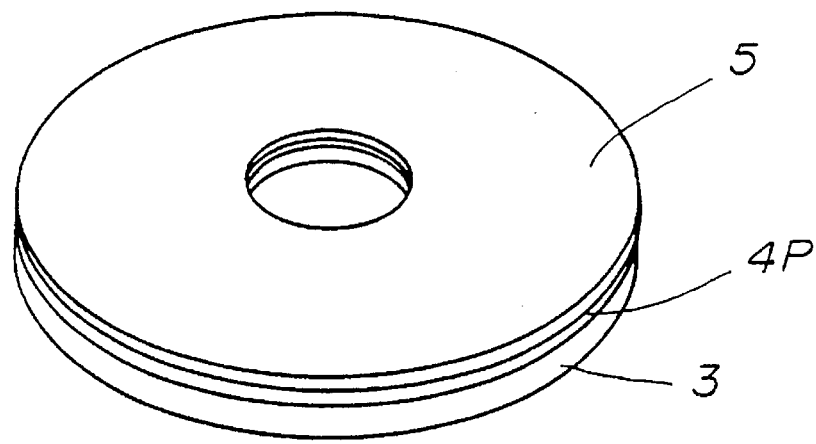
FIG. 57 is a perspective view for explaining a recording layer forming process.

Next, a step S2 shown in FIG. 54 forms a recording layer 5 on the under layer 4P. As shown in FIG. 57, the recording layer 5 is formed to a thickness of 0.2 μm by sputtering CoCr on the under layer 4P which is formed in the previous step S1. This recording layer 5 has a perpendicular magnetic anisotropy. Hence, a semi-completed recording medium 1Ps shown in FIG. 57 is obtained.

Figure 1:
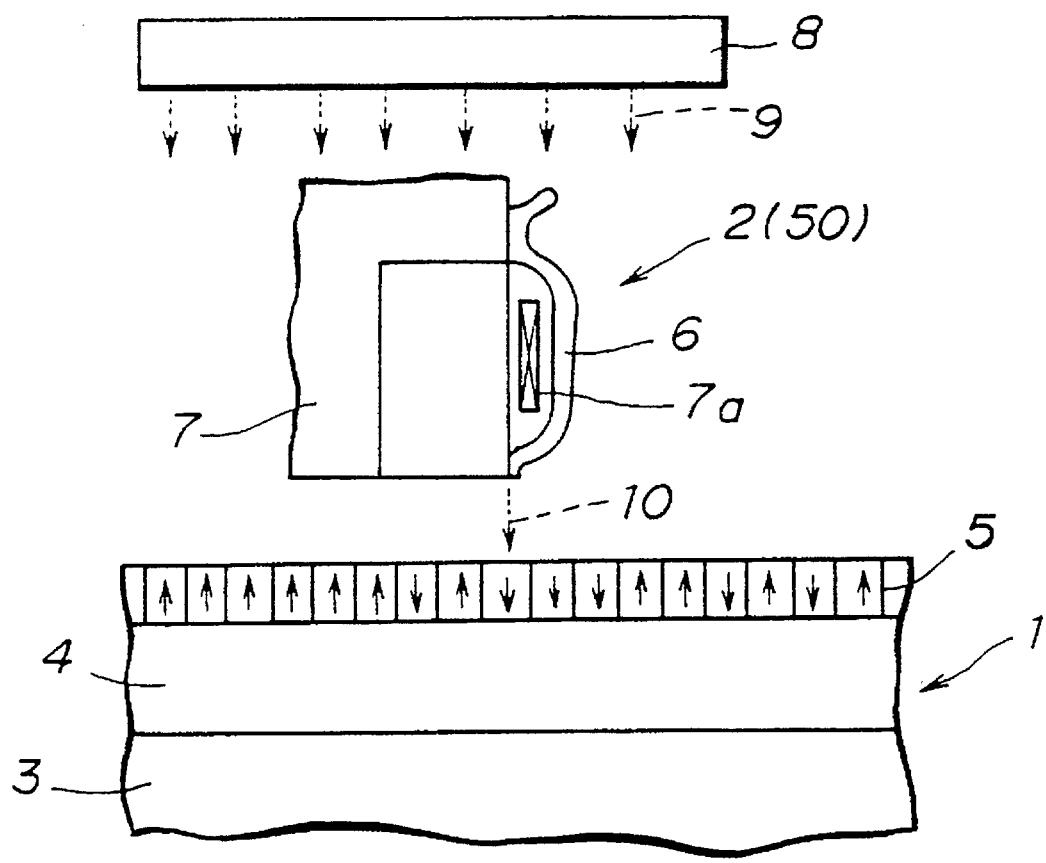
FIG. 1 is a cross sectional view generally showing a single pole head and a conventional perpendicular magnetic recording medium for explaining the effects of a stray magnetic field.
Figure 58:
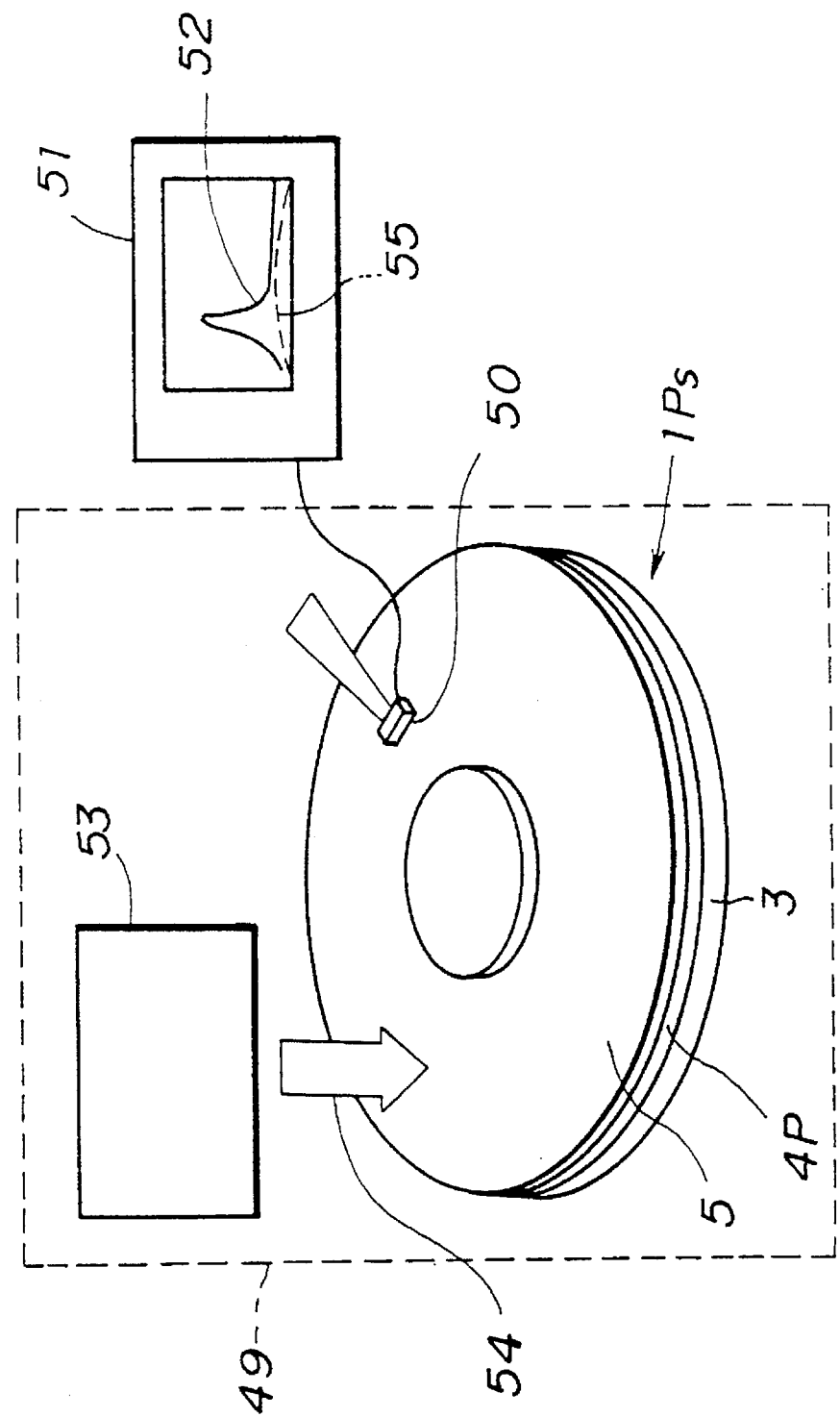
FIG. 58 is a diagram for explaining a process of adjusting magnetic domains of the under layer.

Next, a step S3 shown in FIG. 54 adjusts the magnetic domains of the under layer 4P. In this step S3, the semi-completed recording medium 1Ps is loaded on a reproducing apparatus 49 shown in FIG. 58 which has an internal magnetic field generation source, and a reproduction is carried out by a single pole head 50 as described before with reference to FIG. 1. In this state, the noise related to the under layer 4P is reproduced and this noise is supplied to a spectrum analyzer 51. For example, a noise spectrum 52 is displayed on the spectrum analyzer 51.

Figure 59:
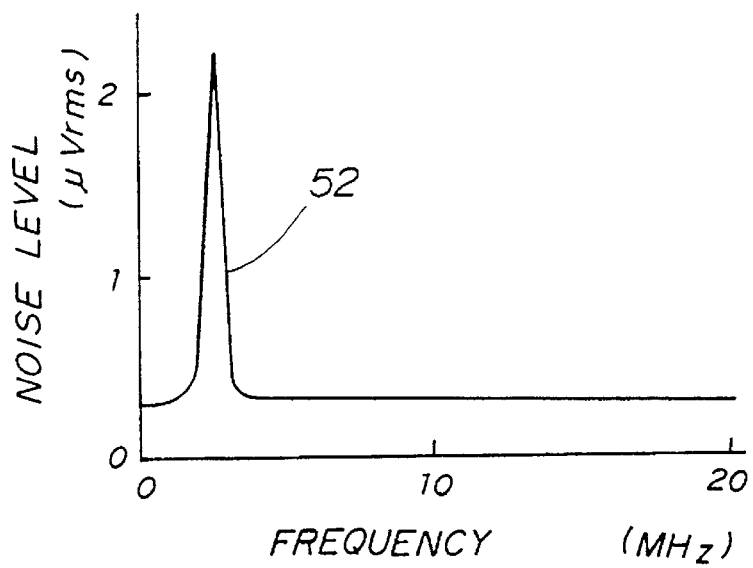
FIG. 59 shows a noise spectrum before the magnetic domain adjustment.

FIG. 59 shows the noise spectrum 52 on an enlarged scale. The measurement was made under the conditions in which the head 50 has a track width of 10 μm, the number of coil turns is 33 turns, the velocity of the recording medium is 13 m/s, and the resolution bandwidth of the spectrum analyzer 51 is 30 kHz. As may be seen from FIG. 59, a noise peak of approximately 2 μVrms exists in the vicinity of 3 MHz and the noise of the recording medium is large.

A magnetic field generation source ("magifield gen." in FIG. 58) 53 is made of an electromagnet or a permanent magnet and is provided within the reproducing apparatus 49. For example, the magnetic field generation source 53 applies a magnetic field 54 of 100 Oe on the semi-completed recording medium 1Ps. In addition, the position of the magnetic field generation source 53 can be freely changed so that the magnetic field can be applied on the semi-completed recording medium 1Ps in an arbitrary direction.

When the magnetic field 54 is applied on the semi-completed recording medium 1Ps, the magnetic domain structure of the under layer 4P is changed, and the state of the noise is changed thereby.

The position of the magnetic field generation source 53 is adjusted so as to adjust the magnetic domains of the under layer 4P while monitoring the noise spectrum on the spectrum analyzer 51, and a noise spectrum 55 is obtained in which the noise is a minimum. In other words, the magnetic domains of the under layer 4P are adjusted so that the noise related to the under layer 4P becomes a minimum.

Figure 60:
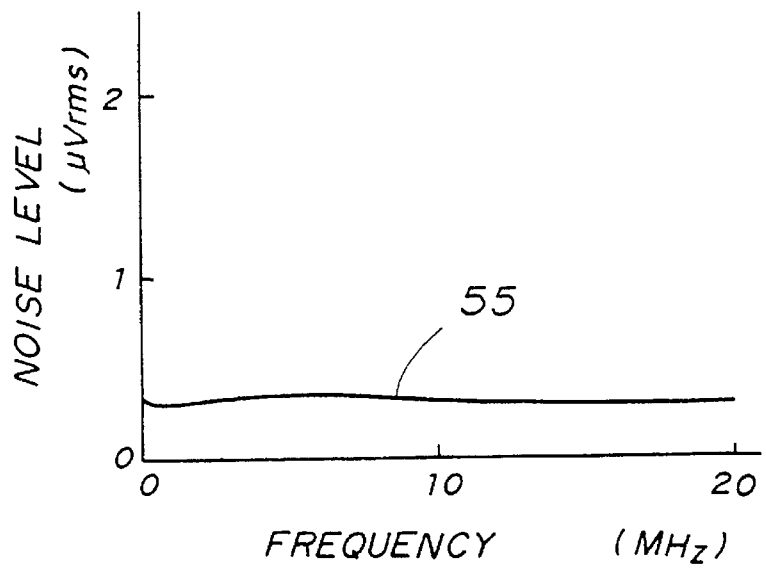
FIG. 60 shows a noise spectrum after the magnetic domain adjustment.

FIG. 60 shows the noise spectrum 55 on an enlarged scale. As may be seen from FIG. 60, the noise peak 52 which existed before the magnetic domain adjustment no longer exists in the noise spectrum 55. In addition, the noise spectrum 55 is approximately flat within the measured band of 1 to 20 MHz, and the noise of the recording medium is greatly reduced.

Figure 56B:
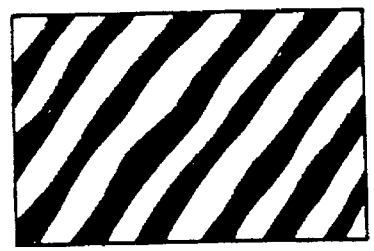
Figure 61:
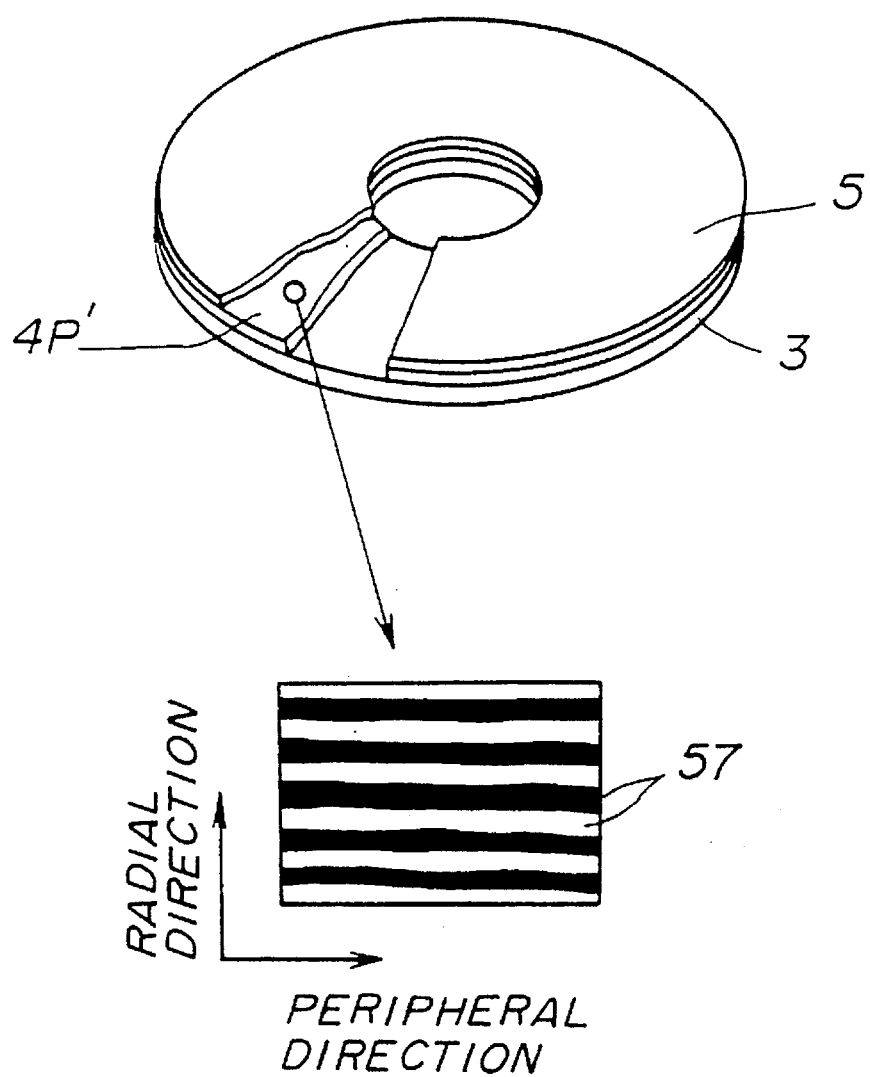
FIG. 61 is a perspective view showing magnetic domains of the under layer after the magnetic domain adjustment.

When the under layer 4P which is formed at the stage shown in FIG. 55 has the stripe magnetic domain structure 4Pb shown in FIG. 56B, each band-shaped magnetic domain 57 of the magnetic domain structure extends in the circumferential direction (direction of the tracks) of the recording medium by the magnetic domain adjustment as shown on an enlarged scale in FIG. 61.

As a result, a recording medium 1P shown in FIG. 61 is completed. In FIG. 61, a under layer 4P' indicates the under layer in which the magnetic domains are adjusted in the above described manner.

The recording medium 1P which is produced as described above only has a small noise level related to the under layer 4P', and the S/N ratio can thus be improved. The stray magnetic field which normally exists within the magnetic recording apparatus is only in the range of 3 to 5 Oe, and the adjusted magnetic domains of the under layer 4P' will not be changed by this relatively weak stray magnetic field.

According to this embodiment, the magnetic domain adjusting step S3 is carried out after the formation of the recording layer 5. However, it is of course possible to adjust the magnetic domains of the under layer 4P immediately after the formation of the under layer 4P. In addition, although the magnetic domain adjusting step S3 adjusts the magnetic domains while monitoring the noise spectrum, it is also possible to successively carry out the monitoring of the noise spectrum and the adjustment of the magnetic domains.

This embodiment can of course be applied to the under layer 4P having the in-plane magnetic domain structure 4Pa and the under layer 4P having the stripe magnetic domain structure 4Pb.

Figures 62A, 62B:
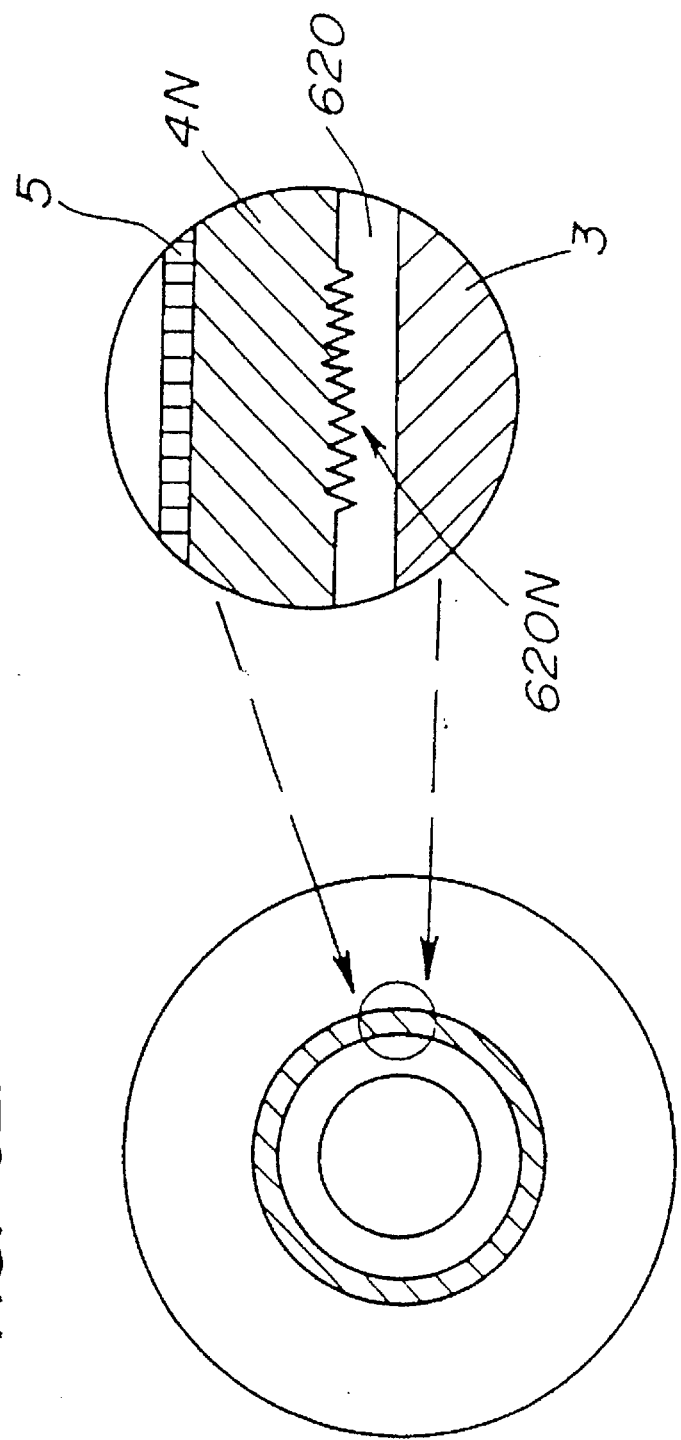
FIG. 62A generally shows a perpendicular magnetic recording medium for explaining a third embodiment of the method of producing the perpendicular magnetic recording medium according to the present invention.
FIG. 62B is an enlarged view of a portion of the structure shown in FIG. 51A, identified by a corresponding circle, in the view of FIG. 62A.

Next, a description will be given of a third embodiment of the method of producing the perpendicular magnetic recording medium according to the present invention, by referring to FIG. 62A and 62B. In the cross sectional view of FIG. 62, those parts which are essentially the same as those corresponding parts in FIG. 51 are designated by the same reference numerals, and a description thereof will be omitted.

In this embodiment of the method, an adhesion layer 620 is formed between the substrate 3 and the under layer 4N. This adhesion layer 620 is provided to improve the adhesion of the under layer 4N and the substrate 3, and is made of titanium (Ti), chromium (Cr) and the like having a thickness of 0.001 to 0.1 μm. In addition, a band-shaped concavo-convex undulation 620 is formed on this adhesion layer 620. The effects of this embodiment are approximately the same as those obtainable in the first embodiment of the method.

As a modification of this embodiment of the method, it is of course possible to form the band-shaped concavo-convex undulation in a part of at least one of the substrate 3, the adhesion layer 620 and the under layer 4N.

In addition, the present invention is not limited to the disk and the production method thereof described in each of the embodiment, and similar effects are also obtainable when the present invention is applied to other types of recording media such as a perpendicular magnetic tape.

Moreover, the materials used for the substrate, the adhesion layer, the hard magnetic layer, the soft magnetic under layer and the magnetic recording layer are not limited to those of the described embodiments.

For example, the substrate may be made of a rigid material or a flexible material. The rigid material may be selected from a group including reinforced glass, aluminum, nickel plated aluminum, aluminum subjected to the alumite processing, ceramics (alumina etc.) and glass glazed ceramics. The flexible material may be selected from a group including organic film such as polyimide and polyethylene naphthalene.

The adhesion layer may be made of a material selected from a group including Ti, Cr, Cu and Al.

The hard magnetic layer may be made of a material selected from a group including FeCo, CoNi, CoPt, CoNiCr, $Fe_3O_4$ and $\delta\text{-}Fe_2O_3$.

The soft magnetic under layer may be made of a material selected from a group including Ni, NiFe, Co, CoZr system materials, CoFe, Fe, FeN, FeSiAl and FeSiAlN. The CoZr system materials include CoZrCr, CoZrNb and the like.

The magnetic recording layer may be made of a material selected from a group including Co system materials, FeCoO, CoNiReP, Ba ferrite and the like. The Co system materials include CoCr, CoCrTa and the like which include Co and at least one of Cr, Mo, V, W, Cu, Al, Ti, Ru, Rh, Re, Os, Ir, Nb, Ta, Zr and Pt.

Further, the present invention is not limited to these embodiments, but various variations and modifications may be made without departing from the scope of the present invention.

What is claimed is:

1. A perpendicular magnetic recording medium for use in a magnetic recording/reproducing apparatus which has a magnetic head for recording/reproduction, said perpendicular magnetic recording medium comprising:

a substrate;

a magnetic recording layer having a perpendicular magnetic anisotropy;

a soft magnetic under layer interposed between said substrate and said magnetic recording layer and subject to undergoing domain wall motion when the perpendicular magnetic recording medium is Used in the magnetic recording/reproducing apparatus as a result of a stray magnetic field inherently existing within the magnetic recording/reproducing apparatus in the vicinity of the magnetic head thereof, the soft magnetic underlayer having a permeability selected to be in a range of from 50 to 800 and a thickness selected to be in a range of from 4 µm to 20 µm; and a stripe magnetic domain structure, formed in said soft magnetic under layer, suppressing motion of the domain walls of said soft magnetic under layer at least with respect to an external magnetic field having a field strength which is greater than 0 and less than or equal to 10 Oe, where the stray magnetic field has a maximum field strength of 10 Oe.

2. The perpendicular magnetic recording medium as claimed in claim 1 wherein each magnetic domain of said stripe magnetic domain structure extends in a direction approximately parallel to recording tracks which are formed on said magnetic recording layer.

3. The perpendicular magnetic recording medium as claimed in claim 1 wherein the soft magnetic under layer is not annealed.

4. The perpendicular magnetic recording medium as claimed in claim 2 wherein the soft magnetic under layer is not annealed.

5. The perpendicular magnetic recording medium as claimed in claim 4 wherein the direction of the magnetic domains is established by application of an external magnetic field to the perpendicular magnetic recording medium.

6. A perpendicular magnetic recording medium for use in a magnetic recording/reproducing apparatus which has a magnetic head for recording/reproduction, said perpendicular magnetic recording medium comprising:

a substrate;

a magnetic recording layer having a perpendicular magnetic anisotropy; and a soft magnetic under layer interposed between said substrate and said magnetic recording layer and subject to undergoing domain wall motion when the perpendicular magnetic recording medium is used in the magnetic recording/reproducing apparatus as a result of a stray magnetic field inherently existing within the magnetic recording/reproducing apparatus in the vicinity of the magnetic head thereof, said soft magnetic under layer having a permeability selected to be in a range of from 50 to 800 and a thickness selected to be in a range of from 4 µm to 20 µm and comprising:

a first under layer formed on said substrate and having a stripe magnetic domain structure and a second under layer formed on said first under layer and having an in-plane magnetic domain structure, and said first and second under layers forming suppression means for suppressing motion of the domain walls of said soft magnetic underlayer at least with respect to an external magnetic field having a field strength which is greater than 0 and less than or equal to 10 Oe, where the stray magnetic field has a maximum field strength of 10 Oe.

7. The perpendicular magnetic recording medium as claimed in claim 6 wherein each magnetic domain of said stripe magnetic domain structure extends in a direction approximately parallel to recording tracks which are formed on said magnetic recording layer.

8. A perpendicular magnetic recording medium for use in a magnetic recording/reproducing apparatus which has a magnetic head for recording/reproduction, said perpendicular magnetic recording medium comprising:

a substrate;

a magnetic recording layer having a perpendicular magnetic anisotropy; and a soft magnetic under layer interposed between said substrate and said magnetic recording layer and subject to undergoing domain wall motion when the perpendicular magnetic recording medium is used in the magnetic recording/reproducing apparatus as a result of a stray magnetic field inherently existing within the magnetic recording/reproducing apparatus in the vicinity of the magnetic head thereof, said soft magnetic under layer having a permeability selected to be in a rands of from 50 to 800 and a thickness selected to be in a range of from 4 µm to 20 µm and comprising:

a first under layer formed on said substrate and having an in-plane magnetic domain structure and a second under layer formed on said first under layer and having a stripe magnetic domain structure, and said first and second under layers forming suppression means for suppressing motion of the domain walls of said soft magnetic under layer at least with respect to an external magnetic field having a field strength which is greater than 0 and less than or equal to 10 Oe, where the stray magnetic field has a maximum field strength of 10 Oe.

9. The perpendicular magnetic recording medium as claimed in claim 8 wherein each magnetic domain of said stripe magnetic domain structure extends in a direction approximately parallel to recording tracks which are formed on said magnetic recording layer.

10. A perpendicular magnetic recording medium for use in a magnetic recording/reproducing apparatus which has a magnetic head for recording/reproduction, said perpendicular magnetic recording medium comprising:

a substrate;

a magnetic recording layer having a perpendicular magnetic anisotropy;

a soft magnetic under layer interposed between said substrate and said magnetic recording layer and subject to undergoing domain wall motion when the perpendicular magnetic recording medium is used in the magnetic recording/reproducing apparatus as a result of a stray magnetic field inherently existing within the magnetic recording/reproducing apparatus in the vicinity of the magnetic head thereof, the soft magnetic underlayer having a permeability selected to be in a range of from 50 to 800 and a thickness selected to be in a range of from 4 μm to 20 μm; and a hard magnetic layer interposed between said substrate and said soft magnetic under layer and forming suppression means for suppressing motion of the domain walls of said soft magnetic under layer at least with respect to an external magnetic field having a field strength which is greater than 0 and less than or equal to 10 Oe, where the stray magnetic field has a maximum field strength of 10 Oe.

11. The perpendicular magnetic recording medium as claimed in claim 10 wherein recording tracks formed on said magnetic recording layer and a residual magnetization direction of said hard magnetic layer form approximately the same angles at any position on each recording track.

12. A perpendicular magnetic recording medium for use in a magnetic recording/reproducing apparatus which has a magnetic head for recording/reproduction, said perpendicular magnetic recording medium comprising:

a substrate;

a magnetic recording layer having a perpendicular magnetic anisotropy;

a soft magnetic under layer interposed between said substrate and said magnetic recording layer and subject to undergoing domain wall motion when the perpendicular magnetic recording medium is used in the magnetic recording/reproducing apparatus as a result of a stray magnetic field inherently existing within the magnetic recording/reproducing apparatus in the vicinity of the magnetic head thereof, the soft magnetic underlayer having a permeability selected to be in a range of from 50 to 800 and a thickness selected to be in a range of from 4 μm to 20 μm; and a hard magnetic layer interposed between said soft magnetic under layer and said magnetic recording layer and forming suppression means for suppressing motion of the domain walls of said soft magnetic under layer at least with respect to an external magnetic field having a field strength which is greater than 0 and less than or equal to 10 Oe, where the stray magnetic field has a maximum field strength of 10 Oe.

13. The perpendicular magnetic recording medium as claimed in claim 12 wherein recording tracks formed on said magnetic recording layer and a residual magnetization direction of said hard magnetic layer form approximately the same angles at any position on each recording track.

14. A perpendicular magnetic recording medium for use in a magnetic recording/reproducing apparatus which has a magnetic head for recording/reproduction, said perpendicular magnetic recording medium comprising:

a substrate;

a magnetic recording layer having a perpendicular magnetic anisotropy;

a soft magnetic under layer interposed between said substrate and said magnetic recording layer and subject to undergoing domain wall motion when the perpendicular magnetic recording mediaum is used in the magnetic recording/reproducing apparatus as a result of a stray magnetic field inherently existing within the magnetic recording/reproducing apparatus in the vicinity of the magnetic head thereof; and said soft magnetic under layer having a thickness in a range of 4 μm to 20 μm and a permeability in a range of 50 to 800 and thereby forming suppression means for suppressing motion of the domain walls of said soft magnetic under layer at least with respect to an external magnetic field having a field strength which is greater than 0 and less than or equal to 10 Oe, where the stray magnetic field has a maximum field strength of 10 Oe.

15. A perpendicular magnetic recording medium for use in a magnetic recording/reproducing apparatus which has a magnetic head for recording/reproduction, said perpendicular magnetic recording medium comprising:

a substrate;

a magnetic recording layer having a perpendicular magnetic anisotropy;

a soft magnetic under layer interposed between said substrate and said magnetic recording layer and subject to undergoing domain wall motion when the perpendicular magnetic recording medium is used in the magnetic recording/reproducing apparatus as a result of a stray magnetic field inherently existing within the magnetic recording/reproducing apparatus in the vicinity of the magnetic head thereof, the soft magnetic underlayer having a permeability selected to be in a range of from 50 to 800 and a thickness selected to be in a range of from 4 μm to 20 μm;

suppression means for suppressing motion of the domain walls of said soft magnetic under layer at least with respect to an external magnetic field having a field strength which is greater than 0 and less than or equal to 10 Oe, where the stray magnetic field has a maximum field strength of 10 Oe; and said suppression means including a band-shaped concavo-convex undulation which is formed on a part, only, of at least one of said substrate and said soft magnetic under layer, said band-shaped concavo-convex undulation being approximately parallel to recording tracks which are formed on said magnetic recording layer.

\* \* \* \* \*

UNITED STATES PATENT AND TRADEMARK OFFICE
CERTIFICATE OF CORRECTION

PATENT NO. : 5,589,262
DATED : Dec. 31, 1996
INVENTOR(S) : KIUCHI et al.

It is certified that error appears in the above-indentified patent and that said Letters Patent is hereby corrected as shown below:

Col. 7, line 53, change "to be the" to --to the--;
line 64, delete "1".

Col. 9, line 67, change "there to" to --thereto--.

Col. 17, line 57, change "FIG. 51" to --FIG. 51A and in an enlarged cross-sectional view in FIG. 51B--.

Col. 18, line 5, change "FIG. 51" to --FIG. 51A and in an enlarged cross-sectional view in FIG. 51B--.

Col. 19, line 30, change "magifield" to --mag. field--.

Col. 20, line 26, change "FIG. 51" to --FIGS. 51A and 51B--.

Col. 21, line 22 (Claim 1, line 11), change "Used" to --used--.

Signed and Sealed this

Eighth Day of July, 1997

Attest:

Attesting Officer

BRUCE LEHMAN

Commissioner of Patents and Trademarks